(12) United States Patent
Allsbrook et al.

(10) Patent No.: US 11,683,110 B2
(45) Date of Patent: Jun. 20, 2023

(54) EDGE SYNCHRONIZATION SYSTEMS AND METHODS

(71) Applicant: ClearBlade, Inc., Austin, TX (US)

(72) Inventors: David Aaron Allsbrook, Austin, TX (US); Steven Manweiler, Driftwood, TX (US); Sanket Deshpande, Austin, TX (US); Martin Pandola, Austin, TX (US)

(73) Assignee: Clearblade, Inc., Huntsville, AL (US)

( * ) Notice: Subject to any disclaimer, the term of this patent is extended or adjusted under 35 U.S.C. 154(b) by 35 days.

(21) Appl. No.: 17/032,955

(22) Filed: Sep. 25, 2020

(65) Prior Publication Data
US 2021/0021361 A1 Jan. 21, 2021

Related U.S. Application Data

(63) Continuation-in-part of application No. 16/799,298, filed on Feb. 24, 2020, which is a continuation-in-part of application No. 16/357,779, filed on Mar. 19, 2019.

(60) Provisional application No. 62/942,131, filed on Nov. 30, 2019, provisional application No. 62/647,447, filed on Mar. 23, 2018.

(51) Int. Cl.
*H04J 3/06* (2006.01)
*H04L 47/2425* (2022.01)

(52) U.S. Cl.
CPC ........ *H04J 3/0638* (2013.01); *H04L 47/2433* (2013.01)

(58) Field of Classification Search
CPC ...... C09D 11/101; C09D 11/38; H04J 3/0638; H04L 45/026; H04L 45/08; H04L 45/12; H04L 45/121; H04L 45/22; H04L 47/2433; H04L 61/2038; H04L 61/2553; H04L 61/6022; H04L 63/0876
See application file for complete search history.

(56) References Cited

U.S. PATENT DOCUMENTS 10,972,588 B2 4/2021 Amin et al.
2014/0129512 A1 5/2014 Kawecki, III
(Continued)

OTHER PUBLICATIONS

Zhang, Zhensheng "Non-Final Office Action—U.S. Appl. No. 16/799,298" dated Jan. 25, 2022; pp. 1-24 Jan. 25, 2022.
(Continued)

*Primary Examiner* — Zhensheng Zhang
(74) *Attorney, Agent, or Firm* — Stephen H. Hall; Ryan J. Letson; Bradley Arant Boult Cummings LLP

(57) ABSTRACT

The present invention relates to IoT devices existing in a deployed ecosystem. The various computers in the deployed ecosystem are able to respond to requests from a device directly associated with it in a particular hierarchy, or it may seek a response to the request from a high order logic/data source (parent). The logic/data source parent may then repeat the understanding process to either provide the necessary response to the logic/data source child who then replies to the device or it will again ask a parent logic/data sources for the appropriate response. This architecture allows for a single device to make one request to a single known source and potentially get a response back from the entire ecosystem of distributed servers.

8 Claims, 12 Drawing Sheets

(56) References Cited

U.S. PATENT DOCUMENTS

| | | | |
|---|---|---|---|
| 2016/0006645 A1* | 1/2016 | Rave | H04L 45/123 |
| | | | 709/203 |
| 2016/0043942 A1 | 2/2016 | Purohit et al. | |
| 2016/0066358 A1 | 3/2016 | Kim et al. | |
| 2018/0131459 A1* | 5/2018 | Zhang | H04J 3/0641 |
| 2018/0139109 A1* | 5/2018 | Zuerner | H04L 41/5054 |
| 2019/0090305 A1 | 3/2019 | Hunter et al. | |

OTHER PUBLICATIONS

Detse, Kokou R "Non-Final Office Action—U.S. Appl. No. 16/357,779" pp. 1-19 dated Dec. 27, 2021.

* cited by examiner

EDGE SYNCHRONIZATION SYSTEMS AND METHODS

CROSS REFERENCE TO RELATED APPLICATIONS

This application is a continuation in part of U.S. patent application Ser. No. 16/799,298, titled "Asset Synchronization Systems and Methods" and filed on Feb. 24, 2020, which is a continuation in part of U.S. patent application Ser. No. 16/357,779, titled "System and Method for IOT Systems of Logic Across A Continuum of Computers" and filed on Mar. 19, 2019, which claims priority to U.S. Provisional Application Ser. No. 62/647,447, titled "System and Method for IOT Systems of Logic Across a Continuum," filed on Mar. 23, 2018. This application also claims priority to U.S. Provisional Patent Application Ser. No. 62/942,131, titled "Edge Synchronization Systems and Methods" and filed on Nov. 30, 2019. The entire contents of each of the foregoing are incorporated herein by reference in their entireties.

FIELD OF THE INVENTION

This document relates to systems and methods for synchronizing information across an Internet of Things (IoT) hierarchy.

BACKGROUND

IoT is becoming more prevalent, and solutions are beginning to be a part of our everyday lives. Over the last few years, there are trends like MQTT, API-first, IoT Platform, Intelligent Edge. As the number of software applications have grown, many developers and application owners have stored and run their applications in the "cloud", e.g., in large remote server farms accessible over the internet.

While many of these cloud providers are structured to house and protect large amounts of data and applications, having applications run remotely has some disadvantages, including the cost of communicating to and from the cloud, as well as requiring an internet connection, and the time it takes to send or receive information from the cloud that may be hundreds or thousands of miles away. Moreover, in most instances, there is not a direct "connection" between a user of a particular software or app and the cloud. Rather, there may be a large number of hubs or "hops" for a user to ultimately connect to the desired cloud location. This can cause particular problems when there is a large amount of data or there are a lot of requests to and from the cloud. Considering the internet infrastructure, there may be a server that a person interacts with, but there are lots of "hops" along the way between a user's browser and that content. When looking at a static website a user may never actually even communicate with actual hosting server but instead a cached version stored in a CDN.

One example outside of the IoT space is Netflix Open Connect CDN. It takes a long time to pull all those movies and television shows from a central cloud to homes around the world. Thus, to address this, the Netflix Open Connect hardware local ISPs keep caches of content. This is a massive hardware/software build for Netflix specific to its use case, but moves the data from a single central location, to having multiple copies of content distributed geographically closer to its users. While IoT is different than streaming static video, IoT will be a tremendous user of bandwidth and demand high speeds.

Another potential disadvantage of running applications on remote devices is that there may be times when a remote device is not able to communicate with other devices of the network, a developmental or operational platform, or the cloud. This is problematic because the "disconnected" device cannot send or receive information which may be critical to functioning of the device and on which other devices of the system may depend. In addition, when a connection is restored, an application running on the device may have experience problems providing the appropriate data, and may lack updates needed to allow the application to run properly. Improved techniques for asset synchronization in distributed IoT systems are generally desired.

SUMMARY OF THE INVENTION

Applicant has developed systems and methods involving Edge Computer Continuum, representing many layers of computer infrastructure made available to be used as part of the whole IoT application to provide a hierarchy-based, fastest path to every device. The various hardware located at the various hubs between a user and the server that the user interacts with, for example, the routing gear, the cell phone towers, and the satellites, all represent computing opportunities for IoT applications.

Applicant's systems and methods utilize the ubiquitous computing in today's IoT capable world to implement an edge compute continuum. According to Wikipedia, "Ubiquitous computing" (or "ubicomp") is a concept in software engineering and computer science where computing is made to appear anytime and everywhere. In contrast to desktop computing, ubiquitous computing can occur using any device, in any location, and in any format. A user interacts with the computer, which can exist in many different forms, including laptop computers, tablets and terminals in everyday objects such as a refrigerator or a pair of glasses. The underlying technologies to support ubiquitous computing include Internet, advanced middleware, operating system, mobile code, sensors, microprocessors, new I/O and user interfaces, networks, mobile protocols, location and positioning, and new materials."

Applicant's systems and methods use these edge offerings, capable of chaining together. Ultimately, instead of costly on-off solutions made by large clouds or enterprise vendors, middleware capable of making this task easy and transparent for end developers is used.

Other objects and advantages of the present invention will become obvious to the reader and it is intended that these objects and advantages are within the scope of the present invention.

To the accomplishment of the above and related objects, this invention may be embodied in the form illustrated in the accompanying drawings/pictures, recognizing however, that the drawings are illustrative only, and that changes may be made in the specific construction illustrated and described within the scope of the appended claims.

BRIEF DESCRIPTION OF DRAWINGS

Various other objects, features and attendant advantages of the present invention will become fully appreciated as the same becomes better understood when considered in conjunction with the accompanying drawings.

DETAILED DESCRIPTION

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims. Additionally, while much of the description herein relates to mobile apps that interact with mainframe/enterprise/back end systems, the invention is equally applicable to mobile apps that do not interact with such systems.

The present invention provides a system and method for constructing a complete definition of a backend requirements model that can be automatically accessed and interpreted, and generated into a mobile consumable API for creation of mobile applications. The mobile consumable API can be provided and made available to mobile app developers on a separate, stand-alone platform, and may act as an intermediary between the mobile app and the primary mainframe/enterprise/back end system.

Various embodiments may have one or more of the components outlined below.

Figure 1:
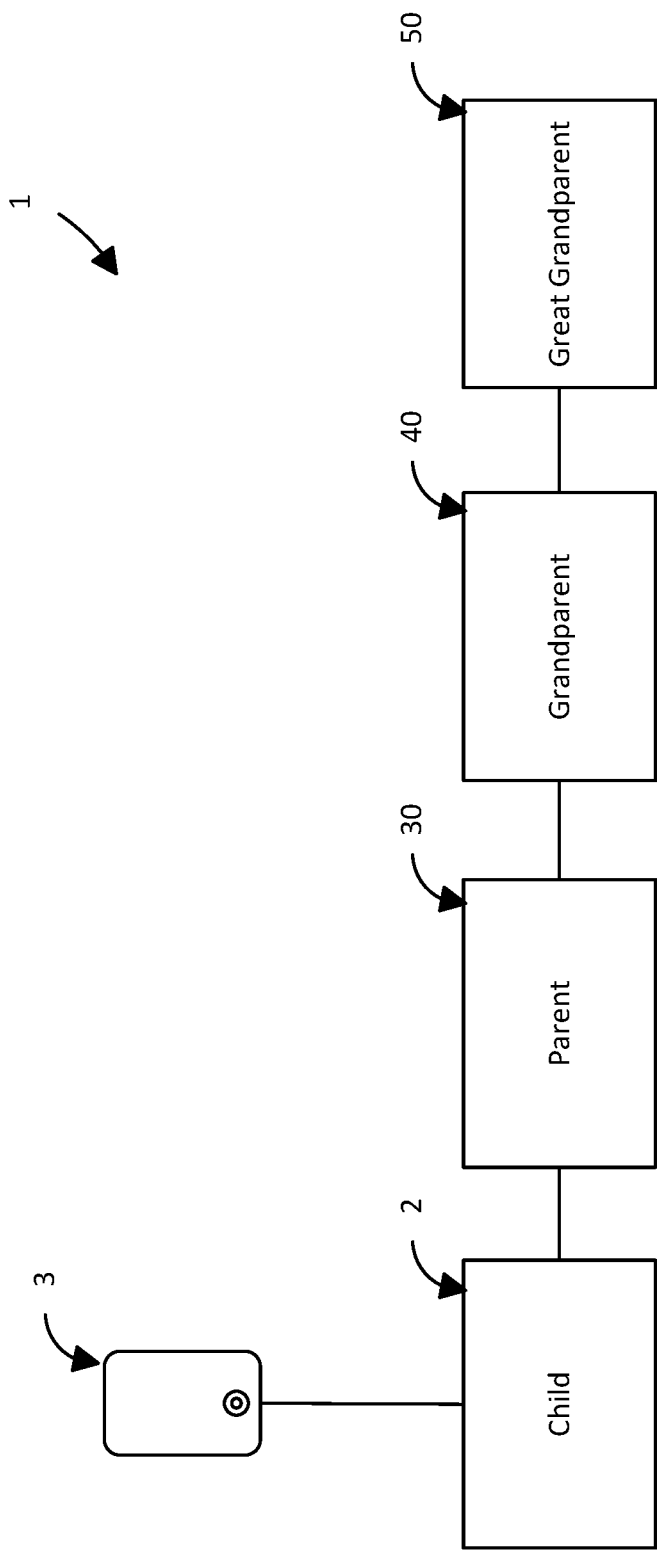
FIG. 1 depicts a deployed ecosystem of IoT devices in accordance with some embodiments of the present disclosure.

IoT devices existing in the deployed ecosystem 1 will have multiple requests for data and updates from their state. This information must be communicated in an efficient method reducing redundancy, execution time and errors. To achieve this, a device (e.g., device 3 of FIG. 1) must be able to request information from or give information to a logic/data source (e.g., child 2 in FIG. 1). A logic/data source may be similar to a server application. In order to meet speed or data requirements, the logic/data source child 2 may be able to respond to the device 3 directly or it may understand that the request must be met by a higher order logic/data source (a "parent," such as parent 30 in FIG. 1). It may need the parent's 30 source due to additional requirements like ability to compute machine learning algorithms, access to secured third-party systems, or need to share information with other logic/data sources (e.g., grandparent 40 or children 4, and 6 in FIG. 2).

The logic/data source parent 30 may then repeat the understanding process to either provide the necessary response to the logic/data source child 2 who then replies to the device 3 or it will again ask a parent logic/data source (e.g., parent 30) for the appropriate response.

Figure 2:
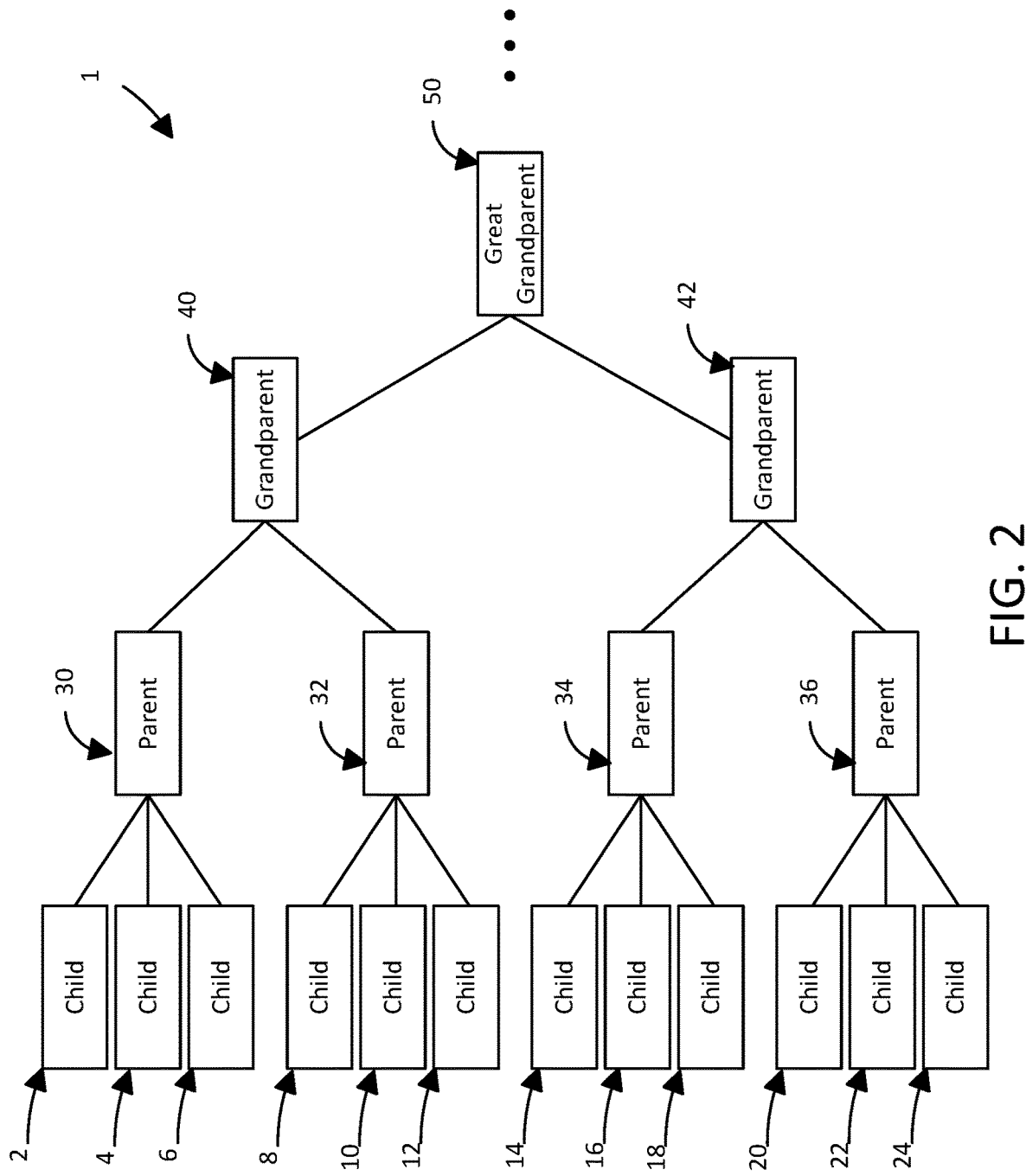
FIG. 2 is one embodiment showing one hierarchy of different computers in accordance with some embodiments of the present disclosure.

The goal of such an architecture allows for a single device, such as device 3 to make one request to a single known source (e.g., child data source 2) and potentially get a response back from the entire ecosystem of distributed servers (e.g., parent 30, grandparent 40, great grandparent 50, or any of the other various sources depicted in FIG. 2).

A device 3, also referred to herein as a "computer," may be included in a hierarchy that may be described as having layers, with computers in a particular layer being characterized as a child computer (e.g., children 2-24 in FIG. 2), the next layer as parent computers (e.g., parents 30-36 in FIG. 2), the next layer as grandparent computers (e.g., grandparents 40-42 in FIG. 2), the next layer as great grandparent computers (e.g., great grandparent 50 in FIG. 2), and so on for as many layers as may be needed or desired. An exemplary embodiment of one hierarchy is shown in FIG. 2. The computers may have operating systems, processors, RAM, and some database or storage. These computers can exist in many different forms, including desktop computers, laptop computers, tablets, smart phones, and terminals in everyday objects such as a refrigerator, thermostat, and other internet connected smart devices. The underlying technologies supporting this distributed computing include the internet, middleware, operating system, mobile code, sensors, microprocessors, new I/O, and user interfaces, networks, mobile protocols, location and positioning, and new materials.

The various computers across this continuum 1 of computers may be coupled to or communicate with each other via a network, such as the internet, local area network (LAN), wide area network (WAN), or the like. The network may be a cellular network such as a Long-Term Evolution (LTE) network in some embodiments. Additional examples that may be used depending on application include low-power wide-area network (LPWAN), low-power wide-area (LPWA) network, low-power network (LPN). In some embodiments nodes of the continuum may communicate via various LPWAN networks, including Long Range (LoRa) or Long Range Wide Area Network (LoRaWAN) networks operating at a frequency of approximately 415 MHz, 858 MHz, or 915 MHz. Other frequencies, networks and protocols are possible are possible in other embodiments. These may be used in situations where long-range communication is required, at a low bit rate, for example, those described with regard to FIGS. 2, 3, and 10. Lower power requirements associated with these networks may be suitable for use with nodes associated with devices operating on low or limited-power capacity, such as a battery. Various other types of networks are possible in other embodiments.

In some embodiments, nodes of the continuum 1 may be configured for communication via one or more networks or protocols specific to systems operating on the continuum 1. An example includes networks configured to communicate with Positive Train Control (PTC) technologies, designed to automatically stop a train before certain accidents related to human error occur. Yet other examples of system-specific networks and communication protocols are possible in other embodiments.

A network also may include satellite communication, radio, and other ways to send or communicate data. The computers may include applications or programs stored in memory and executed on a processor. In some embodiments, the continuum 1 can be implemented on a UNIX-based system or other system. The systems and methods described in U.S. Pat. No. 9,038,015, the entire contents of which are hereby incorporated by reference, can be used to implement some aspects of the present disclosure.

In the past, the systems and methods described in U.S. Pat. No. 9,038,015 would likely be implemented in the cloud. However, using the system and method for IoT systems of logic across the continuum 1 of computers as discussed herein can result in faster processing, less expense, and more reliability.

At the various computers, or hubs described herein, embodiments may be implemented in code and may be stored on at least one storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

In one embodiment, use of the term control logic includes hardware, such as transistors, registers, or other hardware, such as programmable logic devices. However, in another embodiment, logic also includes software or code. Such logic may be integrated with hardware, such as firmware or micro-code. A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

In existing systems and methods, most applications and information is stored in the cloud in large cloud storage and computing farms. This can cause problems with security, performance, scalability, offline support, and have tremendous impacts on cost.

Figure 3:
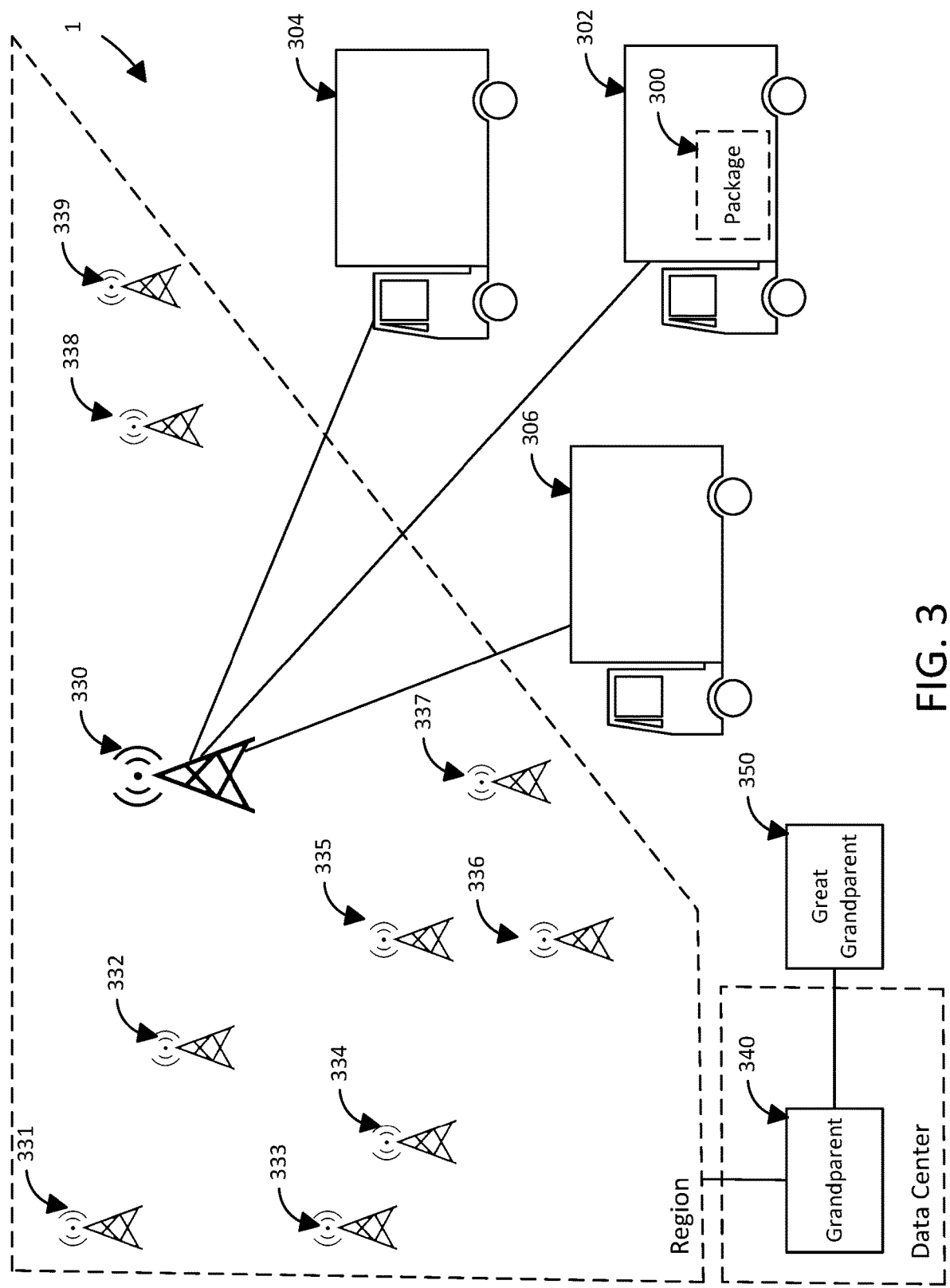
FIG. 3 depicts a deployed ecosystem of IoT devices for package tracking in accordance with some embodiments of the present disclosure.
Figure 4:
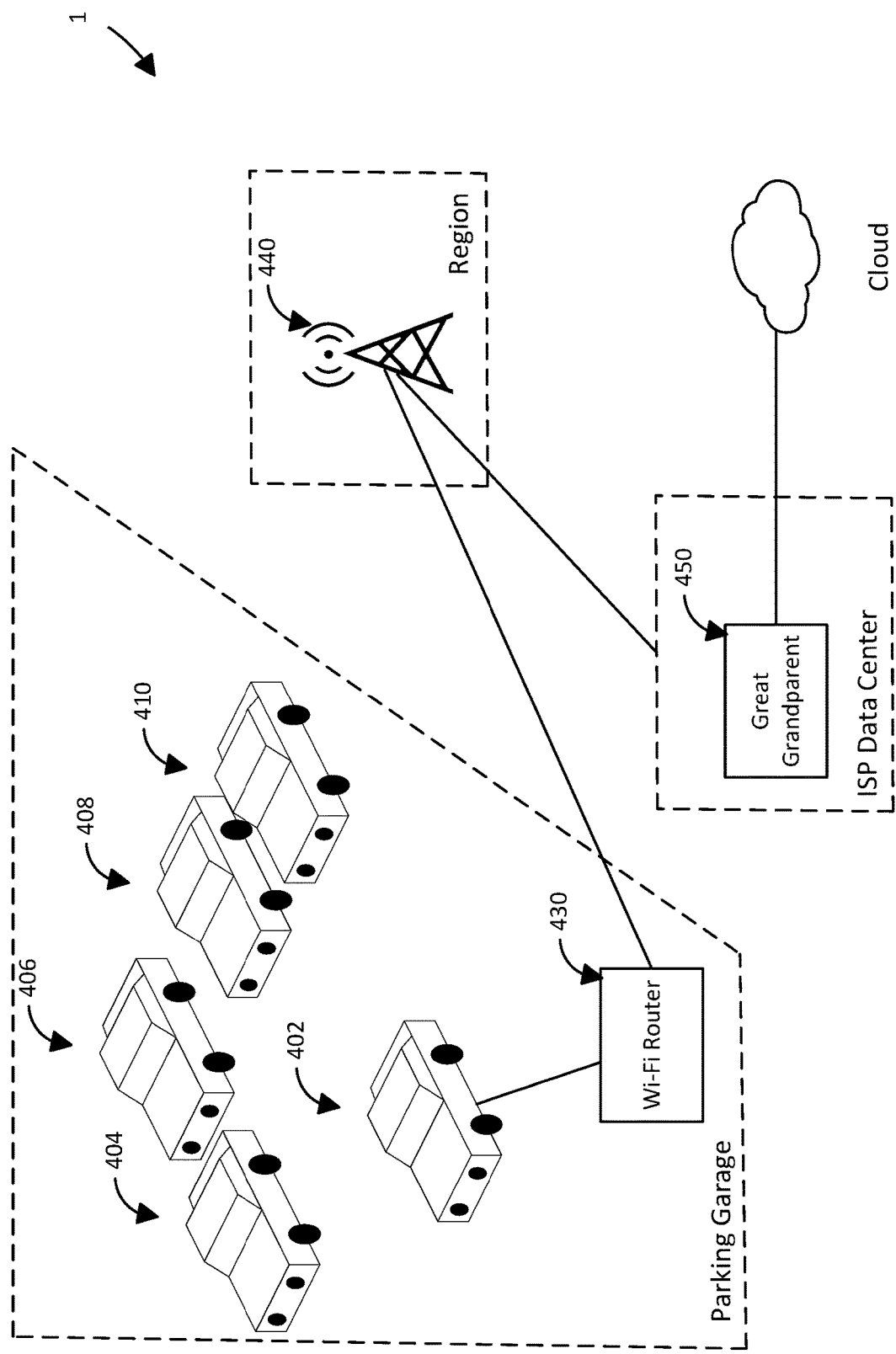
FIG. 4 depicts a deployed ecosystem of IoT devices for traffic monitoring in accordance with some embodiments of the present disclosure.

As one example implementation and embodiment and with reference to FIG. 3, a delivery company may have a need to track and be able to report certain information associated with packages 300 it is handling. A particular delivery truck may have a truck computer 302 which can interact with the packages on board (e.g., package 300). The delivery truck may have information stored on the local truck computer 302 that includes how long the package has been on the truck, and where it needs to be delivered. However, a user within the delivery company (for example, the truck operator) may want or need to know from whom the package is sent. This information is not stored by the truck computer (the "child computer" 2 in the hierarchy described above), so it seeks that information from the computer that is up one level from it, or a parent computer (e.g., parent 30). In this embodiment, that parent computer might be a computer associated with a cell phone tower 330 (FIG. 3). The parent computer 330 is programmed to determine whether it has the data stored, namely from whom the package is sent, necessary to provide the answer to the child computer/truck computer 302. If it does not, it may seek that information from other child computers (e.g., truck computers 304, 306) with which it is associated and connected with in the hierarchy, or it can seek that information from the next higher computer in the hierarchy (e.g., a grandparent computer 340), which may be a larger regional data center computer that covers a specific region (and maybe containing ten (10) different cell phone tower hubs, e.g., hubs 331, 332, 333, 334, 335, 336, 337, 338, and 339). The grandparent computer 340 is similarly programmed to determine whether it has the data stored, and if it does not, it may seek that information from other parent computers with which it is associated and connected with in the hierarchy, or it can seek that information from the next higher computer in the hierarchy (a great grandparent computer 350).

Similarly, assume that an application running on the parent computer/cell phone tower hub needed to know how long a particular package (e.g., package 300) has been on the truck, such as truck 302. If that data is not stored at the parent computer/cell phone tower hub (e.g., hub 330), it could seek that information from all of its child computers (e.g., all the trucks 304, 306 that are associated with this particular parent computer/cell phone tower hub 330) and/or the grandparent (data center grandparent 340). Since that information is stored (in this example) in the truck 302 that has the particular package 300, the application running on the parent computer/cell phone tower hub 330 can obtain that information without having to go to the cloud.

Thus, some hubs in this ecosystem 1 may contain various aspects of information. In other words, the child computers/truck computers 302, 304, 306 may only retain information A, B, and C, the parent computer/cell phone tower hub 330 may retain information C, D, E, and F, and the great grandparent computer 350/regional data center 340 may retain A, F, G, H, I, J, and K, and other information is contained further up the chain. This configuration effectively deploys the information provider in various places throughout the ecosystem 1.

In this example, the truck 302 does not have to be configured to be able to seek information from the cell phone tower hub 330, the regional data center 340, and other potential sources of the information it seeks—rather it just has to be able to be configured to seek the requested information from its one connection to the cell phone tower hub 330. If the data sought is located at a hub computer up three levels (e.g., great grandparent 350), the truck computer 302 is unaware of that, and it does not matter to the truck computer 302.

This structure provides a number of technological solutions to some technological problems associated with traditional configurations and data flows. It can provide more real-time answers because the data requests are normally not required to be sent to and received from the "cloud", which is often hundreds or thousands of miles away. While the processing time for traditional requests is normally not minutes or hours, for some real-time applications, differences in seconds or even milliseconds of response times can make a significant difference. Additionally, having the data more localized can allow the requested information/connection if the connection to the cloud goes off line or is unavailable. Moreover, every time a request is sent to or information received from the cloud, costs are incurred. As a practical matter, for each "hop" in a network from a user's device to the cloud, there are costs that are incurred. When there are thousands, hundreds of thousands, or more requests and transmittals across the internet to and from the cloud, the costs can be substantial. By deploying the various information providers in a more distributed and localized fashion, the technological challenges and costs associated with storing and interacting with the cloud can be minimized.

The specific hub computer (i.e., the child computer 2, parent computer 30, grandparent computer 40, etc.) can be programmed or have logic that determines what data is or should be stored locally on that particular computer. The edge process described in U.S. Pat. No. 9,038,015 can be run on each computer. The computer can be a gateway, server, personal device, laptop, or any other type of computer. These computers can have rules that dictate how data and information is stored, transmitted, and the communication between hubs on different hierarchy levels. One or more of the computers can have algorithms that will implement the how, when, and the order of the communication between computers in the hierarchy. In various embodiments, those algorithms may include one or more of (a) cost efficient option (i.e., cheapest way to get data); (b) time performance optimization option (i.e., quickest way to get data); (c) priority (what communication layer should be used, e.g., satellite, radio, etc.); and/or (d) the order (i.e., do I check with parents first, children computers 5 first, etc.)

As another example of one embodiment of the invention, a car 402 running an IoT traffic application (child computer 2 in this example) wants to know the status of traffic on I-35 near Austin, it may first ask the Wi-Fi router 430 in the parking garage 400 (parent computer 30). If the edge/application running in the Wi-Fi router 430 has recently answered that question and has it stored in memory, it may rapidly respond, otherwise it may reach upward to the cell phone tower 440 (grandparent computer 40), where another edge/application sits with a broader set of constituents (e.g., other towers in the region, as illustrated in FIG. 3). It again may answer a traffic request if it has a recent information or it will ask the local ISP data center 450 (great grandparent computer 50). This ISP data center, is actually the target of local traffic data, meaning the status of the cars is sent to the ISP as it moves to the cloud. Rather than having to send the information up to the cloud to process and analyze the ISP is actually able to run the cloud logic locally and leverage the capability. This means that a serverless function that used to only run in the cloud now runs right where the data is closest and ingested. Now the ISP data center 450 can push that summary back up to a cloud so that other cities have access to traffic information, or it can keep it local, not wasting more computation resources. Additionally the original car 402 who made the request never had to know how the traffic question was answered, it simply asked and the application optimized itself and returned the information in the optimal manner.

In the traditional methodology, there might be a smart traffic application that assumes all cars are using 3G. All cars send their data to a local cell tower hub (local), which may send the data to a state hub, which may send the data to a regional hub, and which may then send it to a national cloud storage hub, for example, the Amazon cloud storage facility in Virginia. This requires quite a few "hops" from each node in the network, which can result in delays, and be costly over time.

Again, there is software running on these edge computers that is specific to each of these different applications. In the above example, a third party would write the traffic application and it is designed and configured to preferably optimize the hierarchy, where data is stored, where it is processed, etc. In other words, it is structured so that data elements A, B, and C, are stored at the child level (cars 402-410), elements D, E, and F are stored at the parent level (e.g., tower hub 440), and processing of X, Y, and Z are addressed at the parent level (hub 440). In some embodiments, requirements, data storage, and processing can be dynamically reallocated and/or deployed. For example, if a system is initially set up to store data element J at the grandparent level, but the system detects that child computers are requesting that data at a certain level (e.g., more than 10 times an hour), the system may dynamically redeploy and reallocate so that data element J is stored at the parent 10 level to minimize response times and reduce costs. Similarly, the system can also be predictively deployed or reallocated. For example, if the system has access to data that the temperature will be 100 degrees in about five days, the system may provide instructions to buy electricity now at a cheaper price.

In some embodiments, the system and method is configured to be take advantage of unstructured/unorganized communication. While a communication model where everyone (or every computer) speaks to everyone is great for a social network, it fails when it comes to enforcing truth and guaranteeing task completion. Consequently, the Edge Continuum of some embodiments contemplated by applicant remains a better implementation by forcing a hierarchy, guaranteeing a source of trust, and ensuring that every device that sends data or needs data gets an accurate responsive channel of communication.

IoT will become a reality in more and more everyday products, homes and businesses. As the momentum builds with more silicon providers making it cheaper to distribute accordingly, there will be a demand to better utilize the infrastructure.

Figure 5:
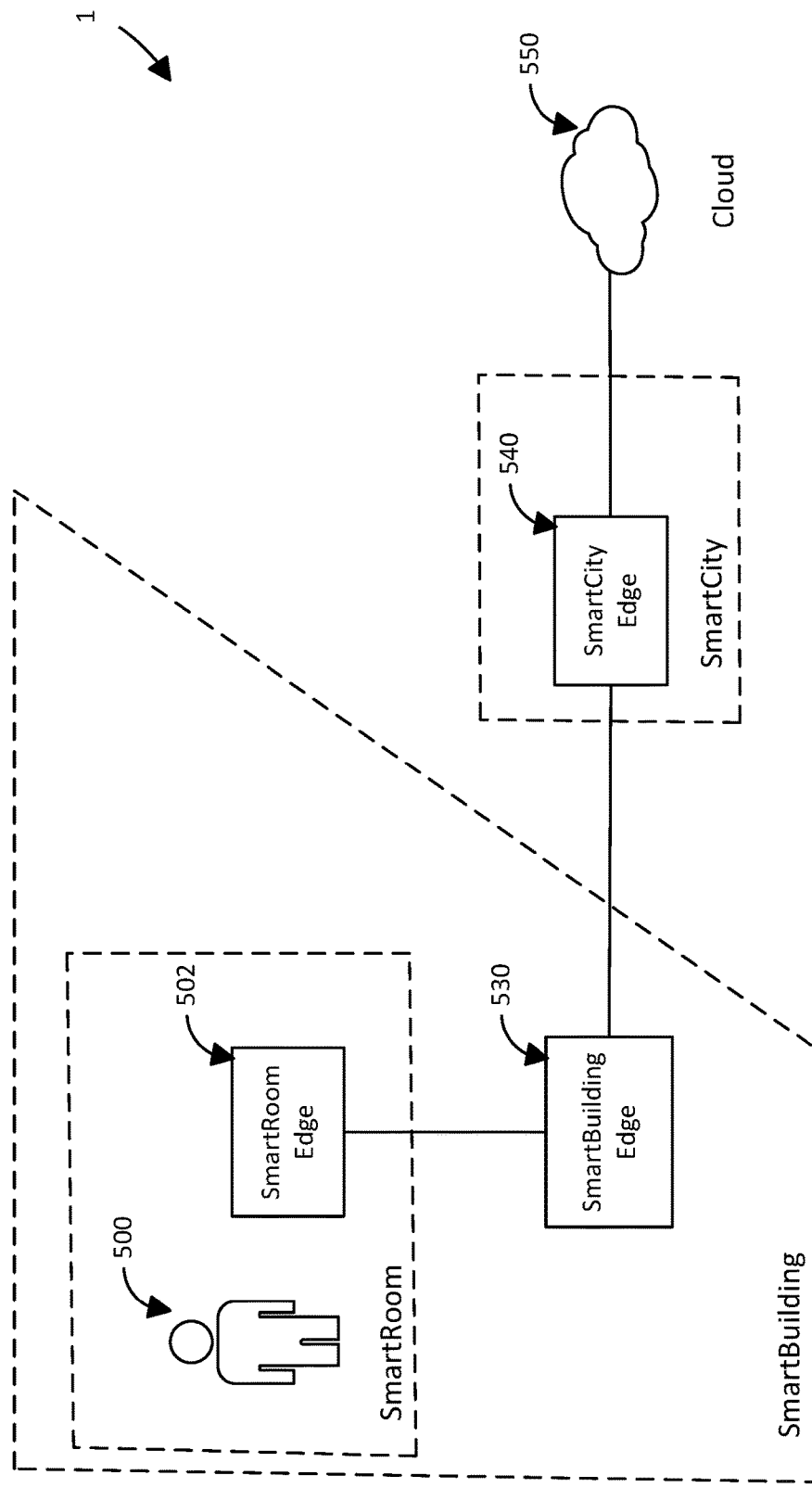
FIG. 5 depicts a deployed ecosystem of IoT devices in accordance with some embodiments of the present disclosure.

FIG. 5 depicts an optional configuration of the continuum 1 and its components in accordance with some embodiments of the present disclosure. FIG. 5 describes and shows the various computers and are labeled as "SmartRoom Edge" 502 (which might represent a "child computer"), a "SmartBuilding Edge" 530 (which might represent a "parent computer"), a "SmartCity Edge" 540 (which might represent a "grandparent computer"), and the Cloud 550 (which might represent a "great grandparent computer"). Although only one of each is shown, in the filled out ecosystem 1, there may be dozens, hundreds, or thousands (or more) of other computers represented by the single "SmartRoom Edge" computer 502, dozens, hundreds, or thousands (or more) of other computers represented by the "SmartBuilding Edge" 530, etc.

In an exemplary embodiment of the systems and methods related to temperatures, the types of activities and capabilities of the IoT system 1, and the possible workflow of the data requests that might be exchanged between the different computers.

Note that each depicted computer or node (e.g., with regard to FIG. 5, SmartRoom Edge 502, SmartBuilding Edge 530, SmartCity Edge 540, the Cloud 550, etc.) may be referred to herein individually as an "edge."

Activities of the IoT system 1 implemented by the edges can be defined as a set of application programming interfaces or "API's." This set may be referred to herein as a "schema." For temperature related operations, a schema of the system 1 can include APIs for activities such as requesting a room temperature, requesting a list of authorized room users, requesting a list of room owners, predicting the temperature based on a temperature history for the room, and predicting the room's temperature based on information from external data sources. The IoT system 1 thus may be configured to be capable of performing activities including but not limited to asking: 1) what is my temperature?; 2) who is allowed to read my temperature?; 3) who is allowed to set my temperature?; 4) what is my temperature likely to be based upon history?; and 5) what is my temperature likely to be based upon external factors?

Each edge can be aware of the API schema, but does not fully implement the APIs. To implement an API, the edge may need to have the full dataset or integrations necessary to fulfill the request. So, for example, a SmartRoom Edge 502 would need sufficient dataset or integrations to fulfill a request to implement the /getRoomTemperature API. SmartBuilding Edge 530 would need sufficient dataset or integrations to fulfill requests to implement the /getRoomUsers and /getRoomOwners APIs. SmartCity Edge 540 would need sufficient dataset or integrations to fulfill requests to implement the /predictTemperatureFromHistory API, and the Cloud 550 would need sufficient dataset or integrations to fulfill requests to implement the /predictTemperatureFromExternal API. Although each edge is aware of the API schema, each edge may not fully implement the APIs, and it is possible that an edge may not know which other edge implements an API or which APIs a particular edge can implement.

Each edge may have memory storage for storing data. In the context of implementing a schema for temperature activities, the information can include: temperature requests; users and owners of resources of any or various combinations of a SmartRoom or SmartBuilding or SmartCity; temperature history; and temperature information from external sources.

Figure 6:
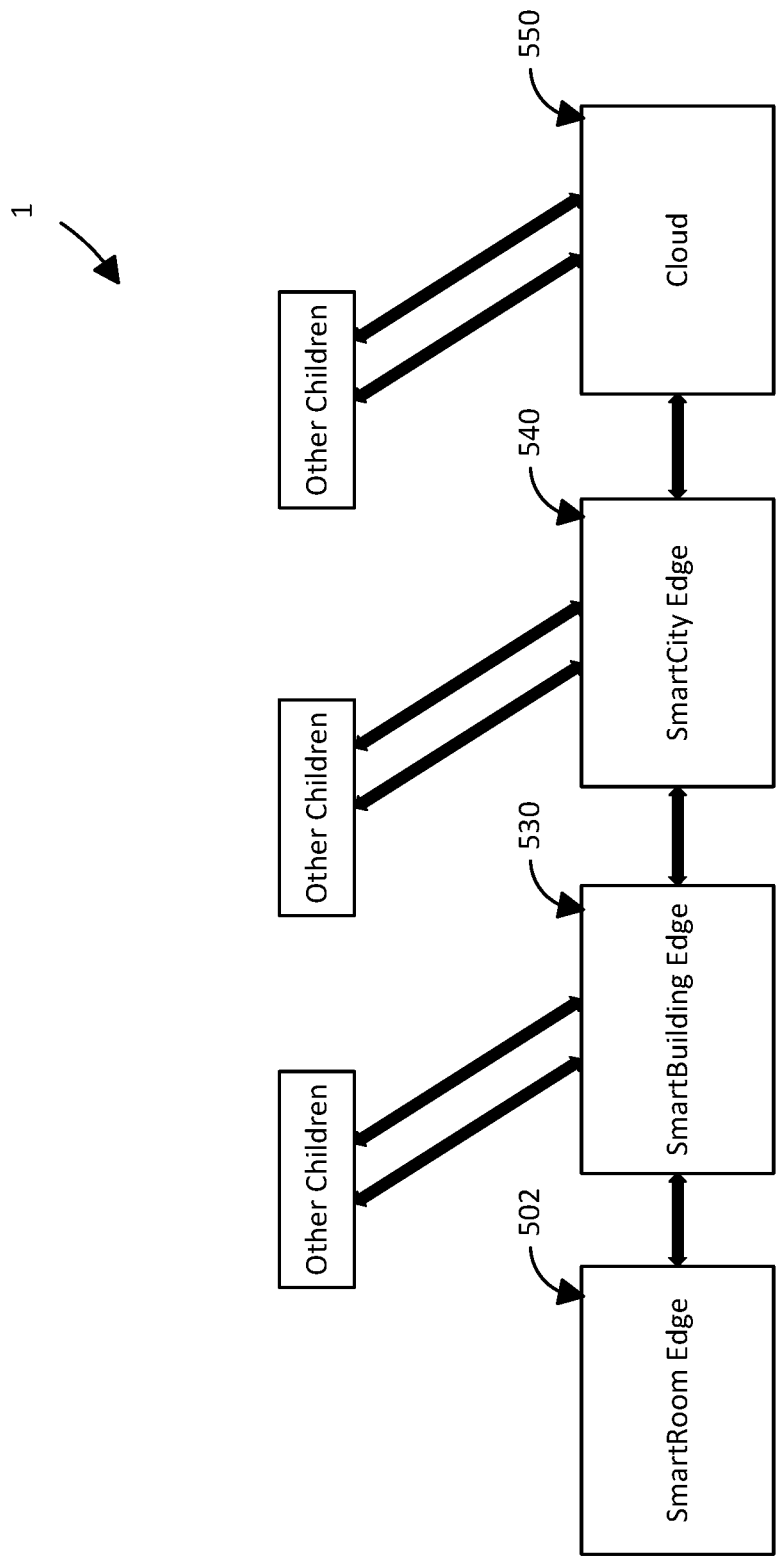
FIG. 6 depicts an exemplary deployed ecosystem of IoT devices in accordance with some embodiments of the present disclosure.

As illustrated by FIG. 6, each edge may generally have a parent/child relationship, although in one embodiment, each edge may have exactly one edge and 0 to many child edges. In addition, a connection between edges may be configured to have a bi-directional information flow. An edge can ask its parent and any children for an API request to be fulfilled, and the networked edge will then either answer the request or pass it along to its connections for fulfillment.

In a first exemplary operation of the embodiment of system 1 depicted in FIGS. 5 and 6, an edge may ask its parent for information. As an example, child 502 may ask parent 530 whether a user (e.g., user 500 who goes by "Jim") can read the temperature. The SmartBuilding Edge has a sufficient dataset or integrations to implement the /getRoomUsers API and can let the SmartRoom Edge child 502 know that Jim is not allowed to read the temperature.

In a second exemplary operation of the embodiment of system 1 depicted in FIGS. 5 and 6, an edge may ask its children and parent for information but only get one answer. As an example, SmartBuilding Edge 530 (parent) may ask SmartRoom Edge 502 (child) and SmartCity Edge 540 (grandparent) what the temperature is. The SmartCity Edge 540 may not have a sufficient dataset or integrations to implement the /getRoomTemperature API and fulfill the request, may ask its children and parent, and may tell the SmartBuilding Edge 530 that it does not know what the temperature is. However, the SmartRoom Edge 502 has a sufficient dataset or integrations to implement the /getRoomTemperature API and fulfill the request and can let the SmartBuilding Edge 530 know that the temperature is 78 degrees. The SmartBuilding Edge 530 only receives one answer (78 degrees).

In a third exemplary operation of the embodiment of system 1 depicted in FIGS. 5 and 6, an edge may ask its children and parent for information, and the edges must find the answer, but the edge only gets one answer. As an example, SmartBuilding Edge 530 (parent) may ask SmartRoom Edge 502 (child) and SmartCity Edge 540 (grandparent) what the temperature will be tomorrow. The SmartRoom Edge 502 may not have a sufficient dataset or integrations to implement the /predictTemperatureFromExternal API and fulfill the request, and may tell the SmartBuilding Edge 530 that it does not know what the temperature will be. The SmartCity Edge 540 also may not have a sufficient dataset or integrations to implement the /predictTemperatureFromExternal API and fulfill the request and determine what the temperature will be, and so may ask its children (other SmartBuilding Edges) and parent, the Cloud Edge 550 (great grandparent). The Cloud Edge 550 has a sufficient dataset or integrations to implement the /predictTemperatureFromExternal API and fulfill the request, and can let the SmartCity Edge 540 know that the temperature will be 44 degrees tomorrow. The SmartCity Edge 540 can then let SmartBuilding Edge 530 know that the temperature will be 44 degrees tomorrow. The SmartBuilding Edge 530 only receives one answer (44 degrees).

In a further example, an edge can be configured to filter messaging noise by examining messages that it receives and determining whether to forward them. If the edge determines that it has received essentially the same message previously, it can ignore the message and not forward it to its parent or children. However, when it receives a message updating a status of at least one previously received message (e.g., the message has not been received previously), the edge may forward the message to its parent or children. In this regard, the system 1 can preserve its ability to handle requests as close to the source of the request as possible without incurring delays from processing requests across multiple hops.

In some aspects, the domain model described in U.S. Pat. No. 9,038,015, can identify the different information providers, integration providers, and system behaviors of a particular application. This information can be used to define the API schema. As described in the appendix, while each computer in the hierarchy is aware of the API schema, each computer may not fully implement the API. In other words, a particular computer may not be able to answer any particular "question" (for example, who is allowed to set my temperature), but it knows whether that is a valid question that can be asked as configured by the domain model.

Figure 7:
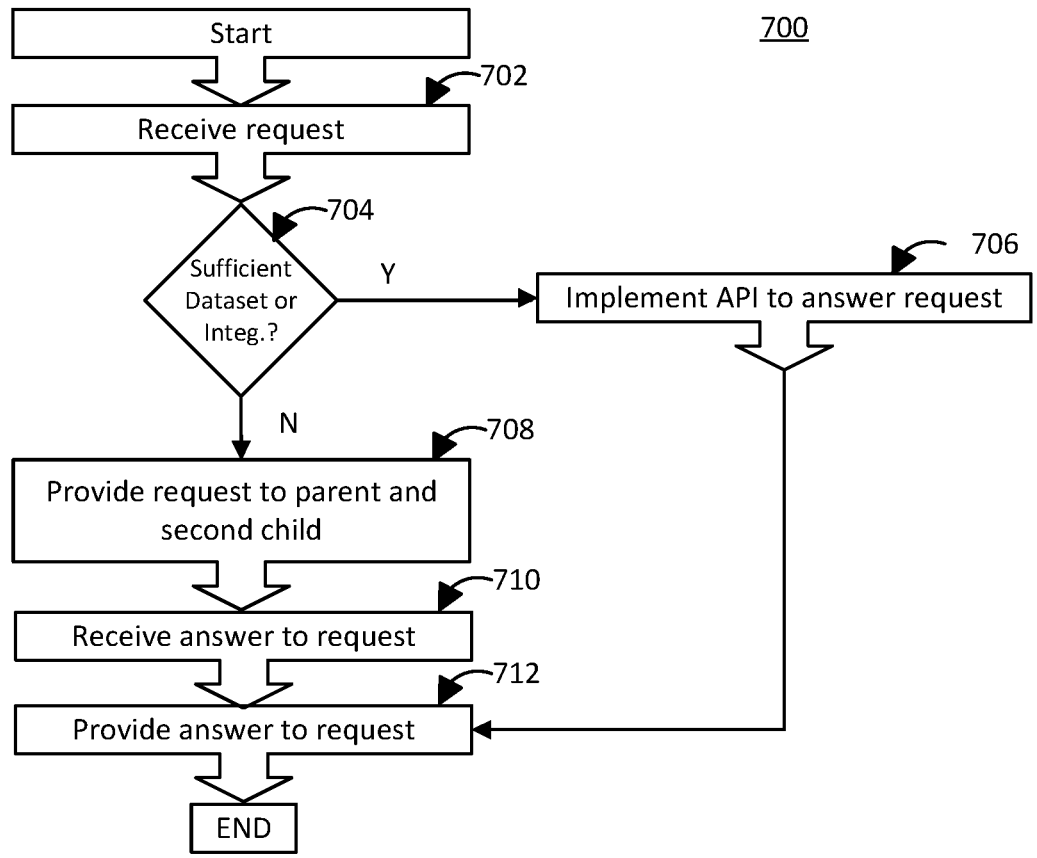
FIG. 7 a flowchart depicting an exemplary method for a deployed ecosystem of IoT devices in accordance with some embodiments of the present disclosure.

FIG. 7 depicts a data flow 700 in accordance with some embodiments of the present disclosure. At step 702, at a node configured to communicate with other nodes in an Internet of Things (IoT) hierarchy (e.g., SmartBuilding Edge 530) may receive a request from a first child node (e.g., SmartRoom Edge 502). As noted above, answering the request may require implementation of an API based on either a dataset or an integration stored in memory at SmartBuilding Edge 530. At step 704, the node may determine whether the node has ether the dataset or integration that is required to implement the API and answer the request.

If the node determines that it has either the dataset or integration, at step 706, the node may implement the API to answer the request, and processing may proceed to step 712 where the node may provide the answer to the request to the first child node. Thereafter, processing may end.

If the node determines that it does not have either the dataset or integration, at step 708, the node may provide the request for information to a parent node of the node (e.g., a grandparent, such as SmartCity Edge 540) and at least a second child node (e.g., a peer of SmartRoom Edge 502). Thereafter processing may continue to step 710, where the node may receive answer to the request from either the parent node (e.g., a grandparent, such as SmartCity Edge 540) or the at least the second child node (e.g., a peer of SmartRoom Edge 502). Processing may then continue to step 712, where the node may provide the answer to the request to the first child node. Thereafter processing may end.

In some embodiments of the system 1 described above, system 1 may be configured to synchronize information across nodes 800 of the continuum 1 according to various exemplary techniques, as described in further detail below. "Node" may refer to one or more of device 3, child 2, parent 30, grandparent 40, or great grandparent 50, depending on the layer of the IoT system in which the respective device is located.

Figure 8:
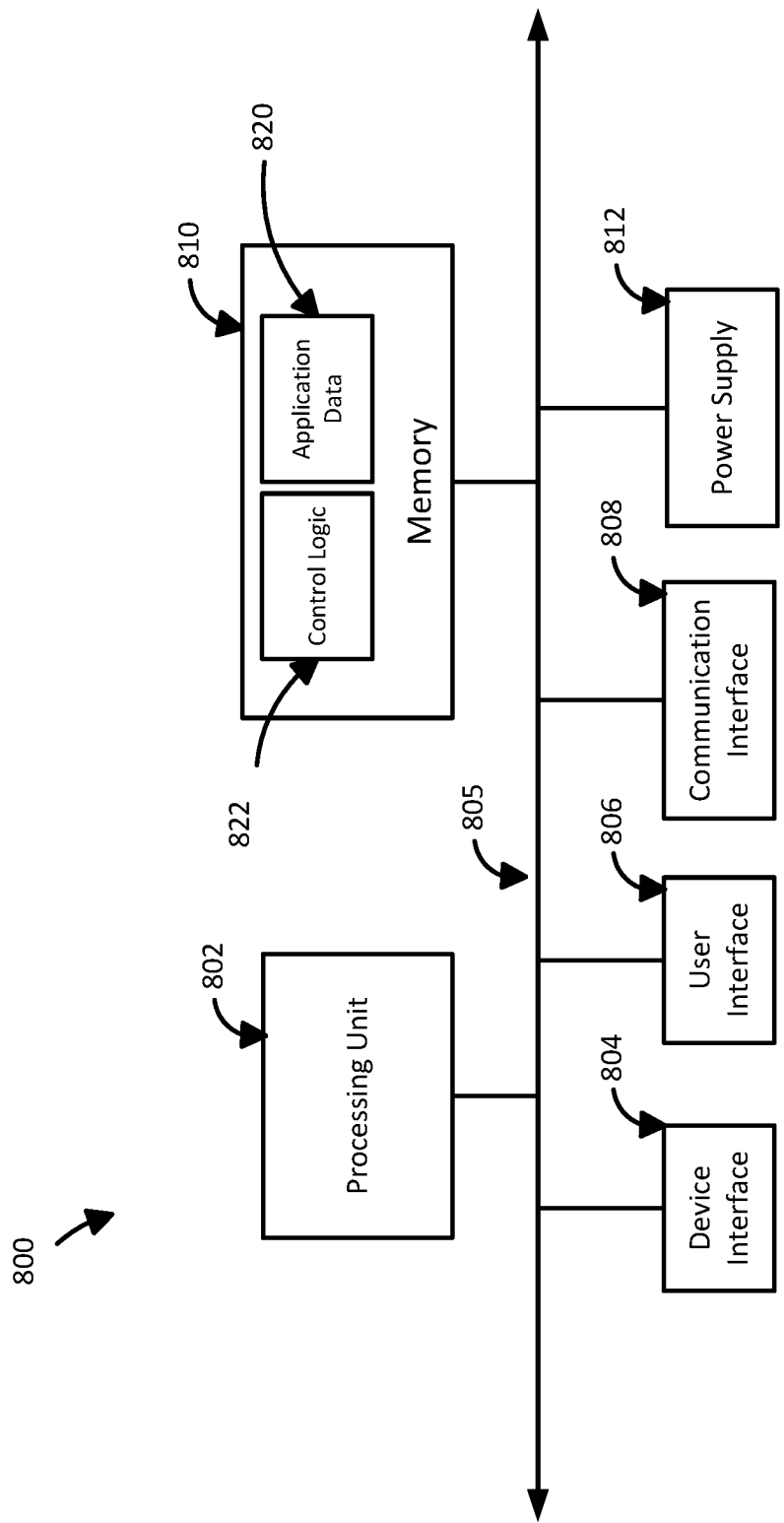
FIG. 8 a block diagram depicting an exemplary node of a deployed ecosystem of IoT devices in accordance with some embodiments of the present disclosure.

FIG. 8 shows an exemplary node 800 in accordance with some embodiments of the present disclosure. The exemplary node 800 of FIG. 8 includes a processing unit 802, device interface 804, a user interface 806, a communication interface 808, and a power supply 812, although other components are possible in other embodiments. The node 800 also includes at least one memory 810 which stores application data 820 and control logic 822. A node 800 may store other information and instructions in other embodiments. Although the node 800 is shown as having particular components and information, in some embodiments, a node 800 may include some, all or various combinations of the components of FIG. 8 or yet other components and information in order to achieve the functionality described herein. In some embodiments, the components of node 800 can vary based on the layer of the system 1 within which the node 800 is positioned. For example, a child node may have components configured to permit communication via one or more different communication protocols than those protocols a parent or grandparent node may be configured to communicate according to. The components of node 800 may be adapted in other ways to achieve the functionality ascribed to nodes of the system 1.

The exemplary node 800 depicted by FIG. 8 includes at least one conventional processing unit 802, which includes processing hardware for executing instructions stored in memory 810. The processing unit 802 may be various types of processor and may include various types of hardware, software, memory, and circuitry as is necessary to perform and control the functions of node 800. As an example, the processing unit 802 may include a central processing unit (CPU) or a digital signal processor (DSP). Processing unit 120 may include a number of processors, and may perform the operations of node 800 based on instructions in one or more memories and memory types, such as memory 810. As used herein, memory may refer to any suitable tangible or non-transitory storage medium. Examples of a tangible (or non-transitory) storage medium may include disks, thumb drives, and memory, etc., but does not include propagated signals. Tangible computer readable storage mediums may include volatile and non-volatile, removable and non-removable media, such as computer readable instructions, data structures, program modules or other data. Examples of such media may include RAM, ROM, EPROM, EEPROM, SRAM, flash memory, disks or optical storage, magnetic storage, or any other non-transitory medium that stores information that is accessed by a processor or computing device The processing unit 802 is configured to communicate with and drive the other elements within the controller 800 via a local interface 805, which can include at least one bus. In addition, the controller 800 can include various communications and output interfaces (e.g., screens, displays, etc.), which are not specifically shown in FIG. 8, but can be included to allow the node to perform functionality described herein. In some embodiments, the node 800 is coupled communicatively to one or more device interfaces 804, user interfaces 806 or communication interfaces 808, for example, via conductive means or via short-range communication protocol, such as Bluetooth®.

Although in some embodiments the processing unit 120 and memory 122 will be described implemented in a node 800 and configured in a particular manner, it will be understood that, in some embodiments, processing unit 802, memory 810, device interface 804, user interface 806 and communication interface 808 may be configured in any suitable manner to perform the functionality of the node 800 (or device 3, child 2, parent 30, grandparent 40, or great grandparent 50) as is described herein. It will also be understood that the functionality of node 800 may be embodied in a single device or a plurality of devices, each including one or more or various combinations of processing units and memory to collectively perform the functionalities of one or more nodes 800 as described herein.

Device interface 804 may comprise hardware, or various combinations thereof configured to communicate with various types of devices configured to capture desired information (e.g., one or more states of one or more physical devices, objects, systems, environments, etc.) and provide the information to the node 800. The device interface 804 may be associated with one or more devices that are associated with or which are themselves physical objects. Exemplary devices with which the device interface 804 may be compatible may include devices such as one or more sensors, cameras, switches, timers, counters, flow meters, thermometers, speed sensors, microphones, seismometers, acoustic sensors, gauges, optical sensors, spectrometers, displacement sensors, chemical sensors, electromagnetic sensors, electrical sensors, moisture sensors, proximity sensors, or other types of input devices. In some embodiments, the device interface 804 may comprise one or more of the foregoing devices, and may provide information captured by the device for use by the node 800. In addition, the device interface 804 may be configured to communicate information to and from the one or more devices may include communications protocols similar to those described with regard to the communications interface 808 below.

User interface 806 can include various combinations of hardware and software configured to implement a human-machine interface between a user and the node 800, such as by allowing a user to receive outputs from and provide inputs to the node. In some embodiments the user interface can include one or more or various combinations of a touchscreen, keyboard, mouse, physical input devices (e.g., buttons or switches), or otherwise.

Communication interface 808 may include one or more various combinations of hardware and software configured to communicate with other nodes of the system 1. In one embodiment, the interface can include components and circuitry for communicating via various wireless (e.g., Wi-Fi, cellular, 5G, LTE, Bluetooth classic, Bluetooth low energy, internet, ZigBee, Radio Frequency, Random phase multiple access (RPMA), Ultra-Wide Band, Near-Field Communication, LPWAN, Narrow Band IOT, LoRa, and LoRaWAN) or wired (e.g., USB, optical fiber, Ethernet, FireWire, HDMI and Lightning) connections and protocols with wired and wireless communication networks. The interface 808 may be implemented via communications hardware (e.g., antennas, circuitry, etc.), or communications software or combinations thereof. The interface 808 may have ports associated with various communications networks. The ports may be various types of ports including physical ports (e.g., COM, I/O ports) or emulated ports (e.g., Bluetooth, USB adapters). A type of port may depend on various factors such as the type of communication network and protocol, and may be implemented in hardware, software or various combinations thereof. In some embodiments, the node may be configured to communicate according to other protocols other networks in addition to those listed above.

It will be understood that the functionality ascribed to the node 800 and components of system 1 is not necessarily dependent upon communication via a particular protocol, and other communication techniques and interfaces are possible in other embodiments. In this regard, the node 800 may include one or more communication interfaces 808 that will allow for communications via desired communication protocols to facilitate synchronization between edges (e.g., children) and cloud (e.g., great grandparent), and can vary based on which layer of the system the node 800 is positioned within. Example communications protocols and techniques may include, but are not limited to the Internet, TCIP/IP, ETP/IP, Pub/Sub Messaging (e.g., MQ Telemetry Transport ("MQTT"), Advanced Message Queuing Protocol ("AMQP")), Request/Response model (e.g., Reference Transactions API, Customer Information Control System ("CICS") transactions), modular open radio frequency architecture ("MORA"). Payload may be formatted or defined as XML, JSON, machine code, bytecode, binary or hexadecimal code, or otherwise.

Power supply 812 may function as a primary power source to components of the node (e.g., memory 810 and data stored in application data 820, such as message data, application data and other information), and may include circuitry for interfacing with one or more of the components of the node. The power supply 812 may include one or more power supplies such as a physical connection to AC power, DC power, or a battery. Power supply 106 may include power conversion circuitry for converting AC power and generating a plurality of DC voltages for use by associated devices, such as via device interface 804. When power supply 106 includes a battery, the battery may be charged via a physical power connection, such as a conductive connection to nearby solar cell, kinetic energy generation, or otherwise. Note that power provided from the battery can change based on temperature, availability of charging resources (e.g., less power available to charge solar-cell charged battery when weather is overcast, sun is down). Yet other types of power components may be used, such as conventionally are used to power a node like node 800.

Application data 820 may include various types of data that a node 800 may require in order to carry out operations of the system 1 and one or more applications running on the node (e.g., as implemented in and carried out by control logic 822), and may include data related to the state of the node, information from one or more application developers, integration providers, messaging providers or otherwise. Formatting of data stored in application data 820 may be proprietary, open standard, etc. The application data 820 can include a plurality of each of state tables, state data, state update data, node maps with addresses, links, and identifiers of parent nodes and children nodes, etc. The state data can include data indicative of a current state or desired state of the node 800 (e.g., state of one or more physical devices associated with the node 800) or similar information for one or more other nodes of the system 1. The state update data can include data indicative of one or more states of the node 800 which may be provided as an update to other nodes of the system 1. In some embodiments, the application data 820 can include a partial or total history of data stored by the node 800, including historical data of states of one or more devices associated with the node 800 (e.g., when connectivity with one or more other nodes is lost). Retention and storage of historical data in application data 820 may be managed by control logic 822.

As an example of types of node states that may be included in application data 820, where the node is configured to measure information about railroad crossings (e.g., nodes 900 and 902 of FIG. 10), the application data can include various information about the number of times a crossing arm (e.g., crossing arms 898, 899) associated with the node was actuated (e.g., moved up and down) and for how long, whether lights of the crossing arm were actuated and for how long, an amount of time required for the crossing arm to lower and raise, whether any anomalies were experienced, identifiers of trains or vehicles that passed the particular crossing arm, dates and times of day, location of the crossing arm, whether another crossing arm associated with the same crossing has been or is performing properly, etc. Other information related to the crossing arms may be included in other embodiments.

As an additional example, the data 820 can include data related to temperature of a room in a building that is monitored and potentially controlled as part of a SmartCity (e.g., using SmartRoom Edge 502, SmartBuilding Edge 530, SmartCity Edge 540 and Cloud 550 of FIG. 5). The data 820 can include numerical temperature values, associated time and location information, information about user access and interactions, or otherwise.

As noted above, references herein to functionality ascribed to one or more components of system 1, such as edges, nodes, device 3, child 2, parent 30, grandparent 40, great grandparent 50, or other devices. may be performed by one or more nodes 800. In some embodiments, the control logic 822 of node 800 may be configured to allow the node 800 carry out such operations. In some embodiments, the control logic 822 may be configured to implement an operational platform similar to that described in U.S. Pat. No. 9,038,015, which is incorporated herein by reference in its entirety. Logic 822 may be configured to perform other functionality in other embodiments.

In this regard, although particular examples of node functionality may be described with reference to node 800, in some embodiments, node 800 (e.g., logic 822) can be configured to perform essentially any of the functionality ascribed herein to one or more of the device 3, child 2, parent 30, grandparent 40, or great grandparent 50. Similarly, in some embodiments, one or more of the device 3, child 2, parent 30, grandparent 40, or great grandparent 50 may be configured to perform some or all of the functionality ascribed to the node 800 (e.g., control logic 822). In the context of this document, the terms "logic," "control logic," or "node logic" may refer to hardware logic, computer readable instructions running on a processor, or various combinations thereof. The logic 822 may be configured to implement desired functionality of a particular node or various combinations of such functionality and used to control operation of one or more nodes of the system 1.

The control logic 822 may include instructions for controlling various operations of the node 800, such as internal communications, power management, processing of messages, systems monitoring, device interface and user interface control, operation of communication interface 808, and the management of other sets of instructions. In one embodiment, the logic 822 may provide an operating system and applications necessary to perform various processing operations that are performed by the processing unit 802 and ascribed to the node 800, logic 822, or various combinations thereof.

The logic 822 also may enable the node 800 to run developer applications (e.g., "business logic") for carrying out various desired operations, including but not limited to the examples described herein. Such applications may be developed and operated via an operational platform of the system 1 or other similar location. Updates may periodically be provided to reachable nodes of the system 1 when available.

The logic 822 may comprise one or more portions of node update logic received from time to time at the node, such as when a developer issues an update or when the system 1 synchronizes logic updates across nodes of the system 1. In some embodiments, a user may modify a setting of the node (e.g., node logic 822) via user interface 806 which may alter functionality of the device and node. In some embodiments, the logic 822 may be configured to receive and install the portions of the node update logic to update the logic 822. In some embodiments, the logic 822 may receive node update logic (e.g., from a parent or child node), determine a first portion of the node update logic to install at the node 800, and then install the first portion of the node update logic at the node. Additional portions of the node update logic may be installed subsequently, if desired. Further, control logic 822 may be configured to modify, remove or replace portions of logic updated by the one or more portions of node update logic.

The logic 822 may be configured to take various actions to install node update logic received at the node 800. The logic 822 may cause the node 800 to shut down, restart, run a power cycle, disconnect from communication with the system 1 or otherwise as part of installing one or more portions of node update logic. In addition, when a node 800 starts up initially (e.g., is powered on or booted as part of a restart) the logic 822 may be configured to receive desired application logic (e.g., from the cloud or otherwise where development and deployment is handled) as an initial part of the synchronization process described herein. One or more developers of the logic 822 for the node may decide whether to optimize synchronization, and may specify various information regarding one or more applications running on nodes of the system, such as: what business logic belongs in which nodes of the system 1, what data and node update logic should be synchronized and what should not, and what synchronization should be optimized, and what should not. When ready, the application (e.g., portions of node update logic) may be distributed to the nodes via one or more deployments which may specify such information as which nodes should receive particular logic, what information is synchronized, what is not synchronized, what synchronization is optimized, and what synchronization is not optimized. Such information can be revised as desired by one or more users or developers in communication with the node. Once the logic 822 has installed a first portion of node update logic, additional portions of node update logic may be installed subsequently by repeating all or some of the same steps as described above for installing the first portion of node update logic.

In some embodiments, the logic 822 can be configured to receive state data from a parent or child node of the node 800 and to generate one or more state updates based on the state data from application data 820. The state updates generated by the control logic 822 can be stored in application data 820. The logic 822 can generate subsequent state updates based on subsequently received state data and store such subsequent updates in memory in application data 820.

The logic 822 further can be configured to determine that at least one additional node that should receive the one or more state updates and identify the at least one additional node that should receive the one or more state updates based on the determination. The at least one additional node may include a parent node of the node 800, a second child node of the node 800, or other nodes of the system 1 (e.g., peer nodes, the cloud, etc.). In some embodiments, the logic 822 may be configured to identify the at least one additional node based on various information consistent with the synchronization techniques described herein. For example, the identification may be based on a determination that one or more additional nodes should have information included in the one or more state updates in order to facilitate desired operation of the one or more additional nodes and the system 1. This may occur, for example, when the one or more state updates comprises information indicative of the current state of the node 800, such as digital twin data. The logic 822 may determine that such information should be provided to the one or more additional nodes that need the current state of the node 800, identify the nodes, and provide the state update to the one or more additional nodes.

In other instances, such as when connectivity with one or more other nodes (e.g., a parent node or one or more children of the node 800) has been lost, the logic 822 may determine that the one or more state updates should not be provided. Instead, the logic 822 may continue to receive state updates, store them, wait until a connection is reestablished and then select the appropriate one or more state updates to provide. In some embodiments, the appropriate state updates may be the latest state update generated or one or more state updates generated based on the latest state data received. In some embodiments, a determination of the appropriate state updates may be based on state data received at desired intervals or otherwise. In some embodiments, the one or more state updates may be generated based on one or more optimization rules, such as which state updates to select and provide (e.g., of node logic 822 or of portions of the node update logic). The rules may be based on the particular application desired for the device with which the node is associated (e.g., collecting and storing historical data if interest lies in events like temperature readings over time to determine average temperature, but discarding historical data if interest lies in events like temperature changes with respect to a threshold). Note also that such optimizations may be toggled on, off, or modified as desired. Unused or unsent state updates and state data may be stored in application data 820 if desired (e.g., as historical data), so that only the desired state data is provided from the node 800. When one or more state updates are provided, such state updates may be propagated throughout the system 1. The propagation may be performed by providing the one or more state updates to one or more parents and children of the node 800, which may forward the updates on to one or more additional parents and children. The logic 822 may repeat the above process as desired based on additional state data received at the node 800 or application functionality in node logic 822.

In some embodiments, the logic 822 can be configured to receive one or more portions of node update logic from a parent or child node of the node 800 and to install the one or more of the portions of node update logic. As described above, the one or more portions of update logic received at node 800 may update logic 822.

In some embodiments, one or more portions of node update logic may be provided from node 800 to a parent of the node 800, which may be propagated to other nodes of the system 1 and the cloud. This may occur for example, when a developer or user makes a change to a particular application that is specified to be synchronized to one or more nodes of the system 1. An example of this functionality may be seen in the context of a code service, but other instances of generation and synchronization of application updates provided as portions of node update logic are possible in some embodiments.

In some embodiments, a user may determine that one or more devices associated with the node are not functioning as desired and generate one or more portions of node update logic to update the logic 822 and provide the node update logic to the node 800. Exemplary modifications may include adjustments to various functionality of devices that may be controlled by node 800, such as reducing timer intervals for a timer that runs too often. A user (or algorithm) may modify a setting of the node via user interface 806 or developer may generate a portion of node update logic to reduce the interval at which the timer runs to the desired interval and may provide the update to the system 1, which may propagate the portion of node update logic to the node 800. Such modifications to the logic 822 may include practically any suitable modifications to logic 822 implemented at node 800 to achieve the desired functionality of the nodes and associated devices. Various other applications will be apparent to one of ordinary skill upon a reading of this disclosure.

The logic 822 further can be configured to determine that at least one additional node that should receive the one or more portions of node update logic and identify the at least one additional node that should receive the one or more portions of node update logic. The at least one additional node may include a parent node of the node 800, a second child node of the node 800, or other nodes of the system 1 (e.g., peer nodes, the cloud, etc.). In some embodiments, the logic 822 may be configured to identify the at least one additional node based on various information consistent with the synchronization techniques described herein. For example, the identification may be based on a determination that one or more additional nodes should receive the one or more portions of node update logic in order to facilitate desired operation of the one or more additional nodes and the system 1.

In addition, portions of node update logic can be configured to modify or update logic 822 that informs the determination that particular update logic should be provided to one or more additional nodes of the system 1 as one or more state updates. For example, a node 800 that includes logic 822 configured to implement an application requiring information regarding the current state of node 800 (e.g., a security program) may be re-associated with a device that requires additional information besides just current state (e.g., a summary of temperature measurements over time). One or more node logic updates may be issued to the node 800 to update logic 822 so that it provides the appropriate information.

In other instances, such as when connectivity with one or more other nodes (e.g., a parent node or one or more children of the node 800) has been lost, the logic 822 may determine that the one or more portions of node update logic should not be provided. Instead, the logic 822 may wait until a connection is reestablished and then select the appropriate one or more portions of node update logic to provide, such as based on the most current information available. In some embodiments, the appropriate one or more portions of node update logic may be identified based on a latest update received for a particular portion of control logic 822.

In some embodiments, an identification of appropriate portions of node update logic to receive and install may be based on desired functionality of one or more devices associated with node 800. In some embodiments, the one or more portions of node update logic may be generated based on one or more optimization rules (e.g., of node logic 822 or of the node update logic). Unused portions of node update logic may be stored in application data 820 if desired (e.g., as historical data) or discarded, so that only the desired node update logic portions are kept and installed. When one or more portions of node update logic are provided that should be propagated to other nodes, such updates may be propagated throughout the system 1. The propagation may be performed by providing the one or more node update logic portions to parents and children of the node 800, which may forward the portions of node update logic on to additional parents and children. The logic 822 may repeat the above process as desired based on additional node logic update portions received at the node 800 or desired functionality of node logic 822.

In some distributed networks, it may be difficult to maintain an accurate representation for interested stakeholders of a current state of an object associated with a node of the system. For example, whether a door is in an open or closed state might be interesting to a business security manager who is responsible for keeping the business secure. The door's current state may be interesting to a facilities manager, who may be interested in preventing a heating or cooling leak and associated energy loss. Law enforcement may be interested in preventing theft, and may want to know whether a door is left open. Other examples of stakeholders interested in a door's status are possible.

In order to determine the current state of the door, some systems may require nodes to poll a node associated with the door for its current state. Some systems may require the node associated with the door to periodically broadcast the door's state to the system, which must transmit the state to a stakeholder via the system an synchronize the information to their appropriate location. This propagation may require substantial resources, and may lead to inefficiencies, redundancy, decreased communications speed, and increased error rates.

In some embodiments, nodes of the system may be configured to implement the synchronization techniques described herein to reduce such problems by generating and maintaining one or more "digital twins" of one or more states of one or more devices associated with the node and propagating the twin across the system 1. The term "digital twin" may refer to a digital representation mirroring one or more states (e.g., a data or logic state) of the one or physical objects and associated nodes. The generation of the digital representation may be based on information received at a node, such as from one or more of the device interface, user interface, information stored in application data, or otherwise, and may be stored in memory (e.g., as application data). Information in the digital twin may be synchronized across the system along with other information according to the techniques described herein. In this regard, the system may reduce traffic of the system and resolve the need for error-prone, redundant and inefficient polling by other nodes of the system.

Figure 9:
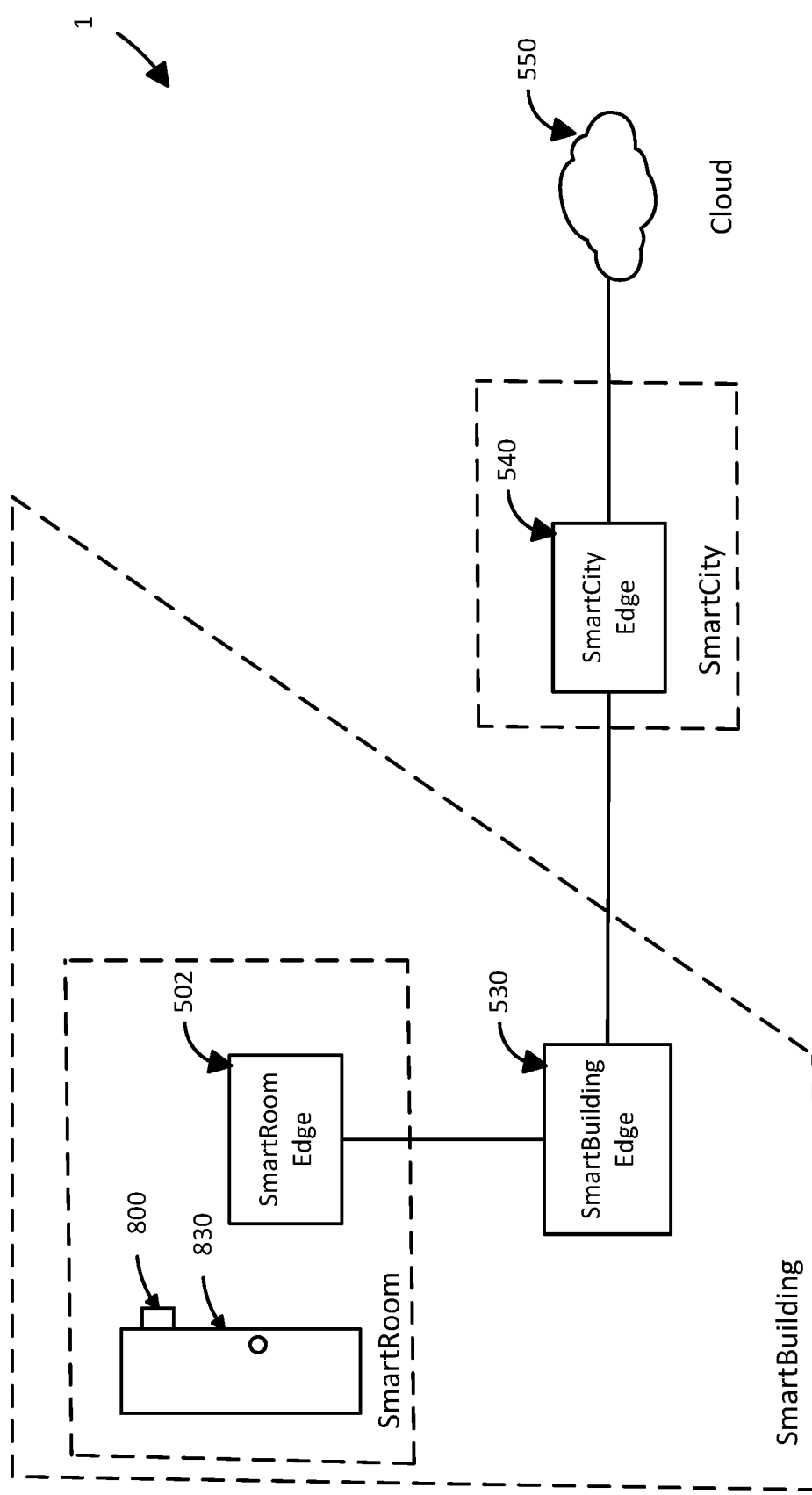
FIG. 9 depicts a deployed ecosystem of IoT devices for a door of a building in accordance with some embodiments of the present disclosure.

An exemplary implementation of the system 1 configured to perform such functionality is shown in FIG. 9. FIG. 9 shows an exemplary node 800 configured to generate and maintain one or more digital twins of one or more states of the node or devices associated with the node (e.g., device interface 804). In FIG. 9, the node 800 is associated with a door 830.

In this regard, the logic 822 may be configured to generate one or more digital twins of the state data for the door 830, which may have two total states: open and closed. The logic 822 may generate note the total number of states associated with the physical object for which the digital twin is being generated and may generate the digital twin having a corresponding number of states. The logic 822 may monitor whether the door is open or closed (e.g., via device interface 804). The logic 822 may periodically note the current state of the door 830 (e.g., "open" or "closed"), and may update the information stored in the digital twin as needed (e.g., when the state of the door 830 changes). The logic 822 may be configured to distribute information related to a current state of the digital twin to other locations (e.g., nodes) of the system 1 so that the current state data for the door 830 may be available for use by one or more other nodes of the system 1.

The logic 822 similarly may be configured to generate one or more digital twins of components of logic of the node or devices associated with the node, such as logic 822, firmware of the device or otherwise. The logic 822 may store information related to such logic and relevant to determining whether an update is required, such as version numbers, update times, etc. Digital twins may be generated to mirror other information in some embodiments.

Figure 10:
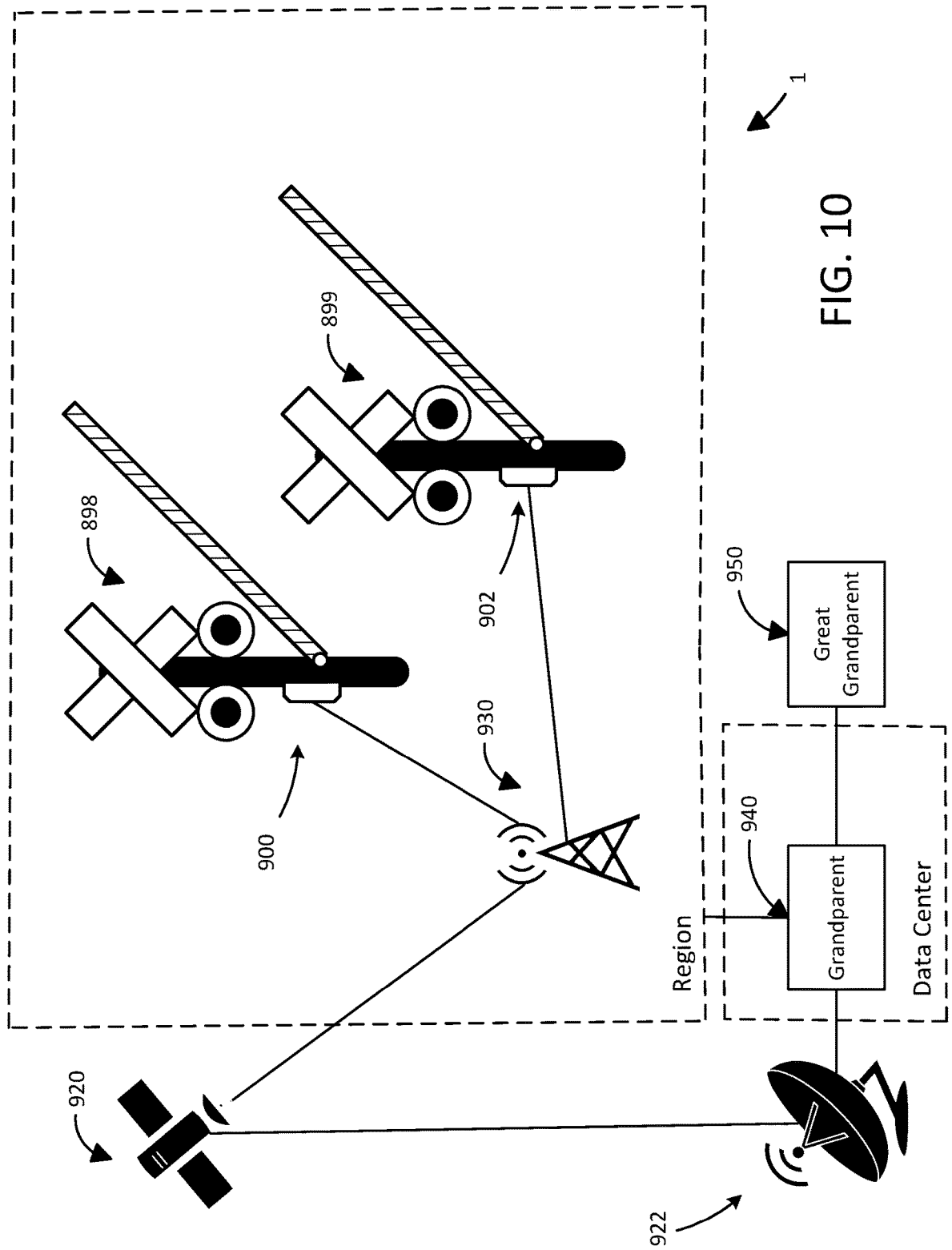
FIG. 10 depicts a deployed ecosystem of IoT devices for monitoring railroad crossings in accordance with some embodiments of the present disclosure.

Note that similar techniques for asset synchronization may be performed across various IoT networks, including the networks described with regard to the illustrative example network shown in FIG. 10.

FIG. 10 depicts a deployed ecosystem of IoT devices for monitoring railroad crossings in accordance with some embodiments of the present disclosure. The system 1 of FIG. 10 includes two railroad crossing arms 898 and 899. Two nodes 900 and 902 are shown, each associated with respective arms 898 and 899. The nodes 900 and 902 are in communication with at least one communication site 930 in the region, which can be configured to communicate with the nodes 900 and 902 wirelessly or otherwise as described herein. An exemplary satellite 920 and communications station 922 are depicted in the embodiment of FIG. 10 for receiving information from the tower 930 and relaying such information to other nodes of the network and the data center, but in some embodiments, information may be relayed back to data center and grandparent 940 via other communicative configurations and systems. The system 1 further include great grandparent 950, which may be the cloud or other platform. Any of the components of FIG. 10 can be configured to operate similarly to those described with regard to various other embodiments described herein.

Nodes 900 and 902 may include control logic (e.g., logic 822, not specifically pictured in FIG. 10) which may be configured to raise and lower when a train comes. A developer of the application for controlling the railroad arms 898 and 899 may want to gather various information, such as metrics and other information regarding whether the arms 898 and 899 are functioning properly, whether the arms are up or down, whether there were any failures or malfunctions detected by the nodes 900 and 902, whether the arms 898 and 899 were tampered with, remaining life of the components of the arms 898 and 899, etc.

In some embodiments, state changes for components of the railroad crossing arms 898 and 899 may be sent back to grandparent 940 and great grandparent 950 in order to permit users to monitor performance of the arms 898 and 899. In an illustrative example, a user may determine that some aspect of performance or functionality of the arms 898 and 899 should change, such as based on information stating that, for example, one or both of arms 898 and 899 is lowering too frequently or other malfunction. The user may generate and provide one or more portions of node update logic to the nodes 900 and 902 as appropriate to adjust the functionality of the arms by reducing frequency at which the arm lowers or by tying lowering of the faulty arm to lowering of a properly functioning arm associated with the same intersection (which should lower at the same time as the affected arm).

In some embodiments, communication site 930 may receive the one or more portions of node update logic and may determine that the node update logic should be provided to the node 900, 902 of the affected arm 898 and 899. If the communications site 930 is in communication with the appropriate node 900, 902, the site 930 may determine whether to provide the one or more portions of the node update logic, such as based on control logic of the site 930, available state data from the respective node 900, 902 or combinations thereof. Based on the determination, the site 930 may provide the one or more portions of the node update logic to the node 900, 902 if the site 930 determines one or more portions of the node update logic should be provided. However, if the site 930 is not in communication with the appropriate node 900 or 902 or the site 930 determines that it should not provide the one or more portions of the node update logic, the site 930 may wait until a determination is made either that communication has been restored with the appropriate node 900, 902 or that the one or more portions of the node update logic should be provided for other reasons.

In some embodiments, once the nodes 900, 902 have received and determined whether to update their control logic with the one or more portions of the node update logic, a notification may be provided to the developer (e.g., via site 930, satellite 920, and station 922 back to the data center and grandparent 940 or great grandparent 950) that the one or more portions of the node update logic have been installed to update the logic of the affected node 900, 902.

Further examples of embodiments in which the asset synchronization functionality of system 1 may be possible are described below.

In an example in the context of manufacturing environment and providing functionality to an edge via node update logic based on state updates, the system 1 may be implemented in a factory, wherein one or more child nodes may be associated with a factory machine or worker on the plant floor. The one or more child nodes may provide sensor data and error rates to a parent node (e.g., of a room or building housing the machines). The parent node may receive the sensor data and error rates from the child edge node, and synchronize such information back to the platform (e.g., great grandparent) where one or more algorithms (e.g., artificial intelligence, neural networks, machine learning, etc.) may be trained using the data. Such models may then be synchronized back down to the edges (e.g., as one or more portions of node update logic provided to the one or more child nodes associated with the factory machine). The edge may then "test" these models to predict failure of the machine. The edge also may monitor location and entry or exit of a secured area by the worker. These concepts can be applied using other information provided to generate one or more portions of node update logic which have different functionality.

Another example is provided by some embodiments in which a drone or other unmanned vehicle is traveling around a city. In some embodiments, the vehicle may include a node configured to gathering video and audio data (e.g., state data). As the vehicle moves from street block to street block it may connect communicatively to a nearby edge node associated with a building. The node of the vehicle may send its data to the nearby building edge where the nearby edge may begin processing the vehicle data and building an overall context and understanding of the data (e.g., using algorithms, models, or other sequences implemented in its control logic). The nearby edge may then synchronize its current vehicle context of understanding to the platform. Subsequently, the vehicle may physically move into another area, where it may connect to another, closer edge. The platform may synchronize the context to the closer edge and the closer edge may continue processing data for the vehicle.

An additional example illustration of the system's synchronization techniques and the control logic 822 may be explained with reference to a system configured similarly to the system 1 shown by FIG. 6, in which each of SmartRoom Edge 502 (child node), SmartBuilding Edge 530 (parent node) and SmartCity Edge 540 (grandparent node) and Cloud 550 (great grandparent node) may be configured to implement node functionality similar to that of the node 800 of FIG. 8. The nodes of FIG. 6 are depicted in the context of "Smart" building implementation, but it will be understood that the functionality described herein for synchronizing information across the nodes may be applied in various other situations in which the system 1 is implemented besides the specific embodiment of FIG. 6.

Node 530 may be configured to receive first state data from child node 502 of the node 530 and generate a first state update based on the first state data. The node 530 may identify at least one additional node (e.g., at least a parent node 540 of the node or a second child node of the node 530) that should receive the first state update. In some embodiments, the at least one additional node may be identified based a determination that the first state update should be provided, as described above. The node 530 may then provide the first state update to the at least one additional node that should receive the first state update.

In some embodiments, the node 800 may further be configured to receive node update logic from a parent node of node 800. The node update logic may be configured to update the node logic 822, and the node 530 may update the node logic based on the node update logic. The node 530 may receive second state data from the child node and may generate a second state update based on the second state data. Thereafter, the node 530 may identify at least one additional node that should receive the second state update, such as based a determination that the second state update should be provided. The node 530 may provide the second state update to the at least one additional node that should receive the second state update.

In some embodiments, the node 530 may be further configured to receive third state data from the child node and establish that the node 530 is unable to communicate with its parent node. The node 530 may receive fourth state data from the child node and may generate a third state update, and the third state update may be based on a determination either that only the fourth state data should be provided or that both the third state data and fourth state data should be provided. The node 530 also may be configured to establish that the node 530 is able to communicate with the parent node and providing the third state update.

Further, in some embodiments, generating the third state update may be based on an optimization rule of the node update logic. In some embodiments, node update logic may be received based on at least the first state data. In some embodiments, updating the node logic comprises restarting the node.

Frequently, a node of the continuum 1 may require information about data (e.g., a state) that requires communication with another node of the continuum 1. In some cases, other node may be close to the requesting node, for example, when requesting node shares a parent node with the other node. In these instances, a time for the requesting node to receive the desired data may be relatively short, because responding to information requests only requires messaging with a mutual parent of the two nodes.

In some instances, a node may seek information about a node that is distant in the hierarchy of the continuum 1 (see FIG. 2). In this instance, a node's request may need to be forwarded to a grandparent node, great grandparent node, the cloud, or even a more senior node, then passed down to a child node in order to retrieve the requested information. Multiple hops may be required in order to fulfill such a request, meaning that it may take longer before the requesting node receives the requested information. If the requested information is critical to desired operations of a system associated with the requesting node, operations at the system may be suspended, interrupted, or otherwise modified until the requested information arrives. This latency may significantly impair operations and decision making ability systems relying on information collected by the continuum.

To overcome this problem, nodes of the continuum 1 may be configured monitor synchronization criteria or attributes associated with message data or state data and periodically update synchronization rules of one or more nodes of the continuum 1. In this and other practical applications, as more fully described below, this technique improves functioning of the nodes of IoT hierarchy, their associated devices, and communication efficiency the continuum itself by recognizing that synchronization rules should be updated contextually to bring information closer to locations where it will be needed in the future.

Updating a node's synchronization rule may be better understood with reference to exemplary node 800 of FIG. 8. One or more synchronization rules may be stored in memory 810 of a node, and may be included in control logic 822. The rules may specify policies and criteria for synchronizing information at the node, such as one or more data sets, integrations, or other information. A synchronization rule update may include one or more changes to one or more aspects of the synchronization rule, associated synchronization behavior, synchronization criterium or otherwise.

A synchronization rule also may specify certain synchronization behavior. "Synchronization behavior" may refer to various actions taken when encountering a type of information or information from a particular source. The synchronization behavior may be based on rules included in a synchronization rule of node logic. In some embodiments, requesting, subscribing, or scheduling communication of updates with other nodes are examples of synchronization behaviors that may be specified by a synchronization rule. A request model synchronization behavior may cause a node to wait until it needs information or to waits until it receives a request for information before requesting such information from another node. A subscription model synchronization behavior may cause the node to automatically forward an update to a subscriber node or receive an update from a provider node when available. A scheduling model synchronization behavior may request or receive updates with reference to a scheduling tool (e.g., requesting or providing updates based on information about a schedule, changes to the schedule, or otherwise), and may request and provide information where needed with the benefit of knowing how long the information will take to request, receive and provide for use in connection with a scheduled event. Other synchronization behaviors are possible in other embodiments.

A node may monitor updates and requests for updates for synchronization criterium. Such synchronization criterium may be specified by synchronization rules regarding such criterium, and may be explicitly or implicitly associated with an update, and may be extracted or generated by the synchronization rule (e.g., logic 822) and stored in memory 810 (e.g., as application data 820 or otherwise). Examples of such criterium may include: a number of previous requests for the same or similar information that have been received, either from a child node or parent node; scheduling information (e.g., dates, times, units, tasks, etc.). Additional examples of criteria that may be implicated by a synchronization rule and which may be noted by a node when deciding whether and how to update a synchronization rule may include a power usage of the node, a data storage capacity (memory), or messaging latency for one or more nodes of the continuum. For example, a rule may be updated to send fewer messages in order to match a reduced power availability at the node (e.g., low battery), to send/receive fewer messages when less memory is available, or to transmit more messages when latency is high (move data elsewhere). The rule may be updated in the future to resume all or some of the previous behaviors. The synchronization rule may specify that only messages having a certain priority should be sent while if messaging frequency should be reduced (e.g., only sending high priority). Other synchronization criteria may be possible in other embodiments.

With further reference to FIG. 8, in some embodiments, node logic 822 may be configured to generate a synchronization rule update which updates a synchronization rule at one or more nodes to change at least one synchronization behavior of the node. A subsequent update may further modify the at least one synchronization behavior of the one or more nodes (e.g., by reverting to a previous behavior or adopting a new behavior).

As an example, a synchronization rule update may change a node's behavior from a request model to a subscribe model, for example, when the node determines (e.g., based on synchronization criterium) that it is frequently receiving requests for information which it must then request from one or more other nodes. The subscribe model may allow the node to receive the frequently used information whenever an update is available. A return to a request model may allow for other nodes to also return to a request model. As described above, this achieves a technical improvement of reduced communication latency in providing information to a requesting node.

As a further example, a synchronization rule update may change a node's behavior from a request model or subscribe model to a scheduling model, for example, when the node determines that that it has information about future scheduled events (e.g., based on synchronization criterium indicating that such information). The scheduling model may allow node to request and receive information at various times implicated by one or more scheduling tools stored at nodes with which the node is in communication (e.g., trains and railroad crossing signals of FIG. 10). For example, the scheduling model may note a time when it should provide a request for information that it expects will be needed, having the benefit of knowing how long the information will take to request, receive and provide for use in connection with one or more scheduled events. This achieves a technical improvement in operation of the continuum by scheduling messaging for times when information is expected to be needed, allowing nodes to receive the most up-to-date information available about a current state of a particular node.

The synchronization rule also update may be configured to request updating of one or more synchronization behaviors associated with a synchronization rule at a child or parent node (e.g., from a request model to a subscribe model). In this regard, when an update is available, thereby allowing contextual updates to propagate throughout the continuum when appropriate. This achieves a technical improvement of harmonization of synchronization rules among nodes of the continuum 1, thereby positioning information at a node closer to one or more other nodes where the information may be needed in the future.

A synchronization rule update further may be configured to subscribe a node to updates to information for which it frequently receives requests (e.g., from a child or parent node of the node) or to automatically forward such information (e.g., to its parent or to another child node). The synchronization rule also may improve communication efficiency by updating subscribed nodes only when a state update from available.

As an example functionality for updating synchronization rules described herein, in some embodiments, a technique for optimizing one or more nodes' synchronization rules may be to subscribe to updates to information for which it frequently receives requests (e.g., from a child or parent node of the node) or to automatically forward such information (e.g., to its parent or to another child node) to subscriber nodes. Another technique may be for a node to forward a request to another node to change synchronization rules at the other node (e.g., from a request model to a subscribe model). A synchronization rule also may improve communication efficiency by updating subscribed nodes only when a state update is available from a parent or child node.

Additional technical improvements achieved by the synchronization rule modification above may be apparent to one of ordinary skill in the art upon reading of the present disclosure.

An example of the functionality included in instructions stored as node logic 822 for updating synchronization rules may be found in an IoT-enabled construction equipment performing repair work on an IoT-enabled interstate bridge, both of which may be part of continuum 1 (FIG. 2). Particular quantities and examples of nodes and associated devices are discussed for illustrative purposes and it will be understood that various quantities, varieties and examples of nodes of the continuum 1 and associated devices may be possible in some embodiments.

Elements of the bridge (e.g., piers, road surfaces, cables, supports, lights, etc.) may be associated with various devices (e.g., various sensors, proximity sensors, cameras, thermometers, voltmeters, anemometers, accelerometers, etc.) for gathering information (e.g., bridge strikes, counting passing vehicles, measuring pavement density, etc.). Each of the devices may be associated with a child node (2-6) and configured to communicate with an edge node 30 associated with the bridge and in communication with the child nodes 2-6. The nodes 2-6 may have various information about their respective devices, conditions (e.g., environmental conditions) and the bridge. The nodes 2-6 may have information about a position, orientation, dimensions, movement, displacement, or other aspect of one or more element of the bridge.

An edge 30 may be associated with the construction zone and may be operable to communicate with child nodes 8-12 associated with construction equipment (e.g., backhoes, bulldozers, cranes, lifts, construction vehicles, etc.). The nodes 8-12 may have various information about the equipment and one or more of its components (e.g., shovels, engines, motors, wheels, temperature gauges, fuel gauges, etc.) including operational status, position, orientation, dimensions, movement, displacement, or other aspect of one or more element of the equipment.

In a situation in which workers perform construction on the bridge, construction zone edge 32 and its child nodes 8-12 may begin operating close to the bridge. In order for the construction zone edge and the edge associated with the bridge to communicate, they must transmit messages for one another through the cloud (grandparent 40, FIG. 2) first.

If a node 8 of the construction zone needs to know about the current load on the bridge in order prevent equipment from overloading or exceeding the bridge's weight capacity (e.g., is within a desired margin of safety), it must ask the edge 30 associated with the construction zone, which must then forward the request to the cloud, which must then forward the request to the bridge edge 30, which may ask a child node 2 for current bridge load measurement. The child node 2 may return the requested information to the bridge edge 30, which may forward it to the cloud 40 and then on to construction zone edge 32 and child 8. This process inherently requires multiple hops and carries significant latency (e.g., approximately 5 seconds or more). In many contexts, this latency may mean the requesting node must wait important messages to arrive at the requesting node. In some circumstances, the node may need to notify a device or user to interrupt operation of associated devices while it waits, such as when a construction vehicle associated with the node 8 may overload the bridge if it enters.

In some embodiments, the construction zone edge 32 may receive a subsequent request from the child 8 for a current bridge load measurement. The construction zone edge 32 may note at least one synchronization criterium associated with the message. The edge 32 may determine that a synchronization rule should be updated so that it receives all bridge load measurements. As an example the edge 32 may determine that it should update its rule because a synchronization rule at the edge 32 specifies a threshold for requests for bridge load information and the edge 32 determines that the number of requests that the edge 32 has received for load information has exceed a request threshold specified by the synchronization rule. In an embodiment, the edge 32 also may generate a synchronization rule update and forward it to its parent 40, and to node 30 which is in communication with child node 2 where updates are generated. In some embodiments, the updates may specify that node 32 should receive all updates provided from child node 2 to node 30 by default (e.g., a subscribe model, as opposed to a request model). In this regard, the node 32 may receive updates received by node 30 from node 2, and may keep such updates available for use by the node 8 as needed.

As an additional note of the advantages of techniques performed by the node logic 822, a messaging latency may be significantly reduced by making the above information available at node 32 whenever node 8 requests it. It has been observed that communications times for exchanging messages between nodes 8 and 32 may be on the order of approximately a millisecond in speed, yielding near real-time information for use by node 8 and operation of associated devices.

This is a technical improvement over aspects of previous systems in that the node logic 822 may recognize that a distance between a node providing frequently used information and a node requesting that information may be reduced. The logic 822 may update synchronization rules in node logic at nodes 30, 40, and 32 (and any other intervening nodes through which a request must be forwarded, such as cloud or great-grandparent 50) to specify that those nodes should subscribe to updates from node 2 so that a most recent available update from node 2 is automatically sent to node 32 via nodes 30 and 40. In this regard, the most recent update received from the node 2 may be available at node 32 for transmission to node 8 when requested, and transmission time for node 8 to receive this information may be greatly reduced (e.g., approximately less than one second or even milliseconds as opposed to approximately 2-5 seconds otherwise).

In absence of this recognition and synchronization update, node 8's request must travel much further in order to reach node 2, leading to far greater messaging latency. Example communications times for exchanging messages between nodes 32 and 30 (requiring messaging through mutual parent 40) may be approximately 2 to 5 seconds. In this regard, information regarding a state of devices associated with node 2 may be unavailable to node 8 for a period of seconds, during which operation of equipment associated with node 8 may be interrupted. Worse, damage may occur to the bridge or a device operating in connection with node 8 if it operates using inaccurate information which leads it to conclude that the current bridge load measurement would permit an additional vehicle (e.g., the vehicle associated with node 8) to enter the bridge, when it actually would not. In this regard, the delay in receiving information could result in catastrophic damage. However, if node 8 is able to access data from node 32 in a matter of milliseconds, it may be prevented from entering the bridge and exceeding its load capacity in most situations where the information at node 32 reflects relatively recent bridge load information.

Moreover, durability of systems operating in connection with nodes of the continuum 1 may be improved through use of the techniques described herein. For example, assume that a machine associated with node 2 encounters an operational issue (e.g., components fall out of balance, become damaged or inoperable, etc.), that will result in damage to the machine or other systems unless the machine stops immediately. In this example, node 8 is associated a power switch for cutting power to the machine associated with node 2 in case of anomalies. Initially, the node 8 is configured to periodically request updates regarding node 2, for example once to twice per day. Node 2 may be configured to update its state at node 30 more frequently (e.g. once per 5 minute interval or other frequency) unless it encounters an emergency.

If node 2 provides a state update to node 30 indicating that a problem has occurred and power should be switched off, or if node 2 loses communication with node 30, it may be unable to communicate an update regarding its state to node 30 to let node 8 know that an emergency has happened and power should be switched off. In this regard, node logic 822 at node 30 may be configured to recognize that communication has been lost with node 2 and to updating synchronization rule of nodes 30 and 40 and parent 32 to specify that the rule should change to subscribe model synchronization behavior from a request model synchronization behavior. In this regard, node 30 may specify that it should provide a last known state of node 2 to node 8, taken approximately minutes ago may be provided to nodes 30, 40 and to node 32, and ultimately available to node 8 when it otherwise would not be (e.g., in the event of loss of communication between nodes 2 and 30). Other events may trigger synchronization rule updates at various nodes in other embodiments.

In another example, a node (e.g., node 2) may be associated with a brake and one or more bearings of a railcar. An update from the node 2 may indicate that one or more bearings on a brake have or will soon fail (which can occur in under 3 seconds), and node 8 associated with a throttle or other device that can take action to address the failure or imminent failure of the bearings (such as slowing the train or switching to another brake system). The node 2 may provide this information to its parent node 30. The parent node 30 may determine that its synchronization rule should be updated to subscribe to updates from the node 2, and may send, to one or more other nodes (e.g., nodes 30, 40, and 32), the state update from node 2 and a request to update synchronization rules of the nodes to subscribe to updates from node 2. The information may be stored and available at node 32 when needed by node 8. A node 2 can be associated with components of systems that may fail without much warning, such as bearings in machinery (e.g., wobbling in rotary blade fan bearings, etc.)

Similar examples of applications in which updating synchronization rules may preserve communication durability and protect system functionality may include operation of security systems, such as security doors cameras, physical devices, locks, alarms or other security devices.

Further example functionality of the node logic when updating one or more synchronization rules is described below with regard to FIG. 11. As shown by the process in FIG. 11 and explained in greater detail below, in some embodiments, synchronization rules of one or more nodes of the continuum 1 may be updated to specify a location in the continuum 1 closer to a node where the information is frequently needed so that it is available more quickly.

Figure 11:
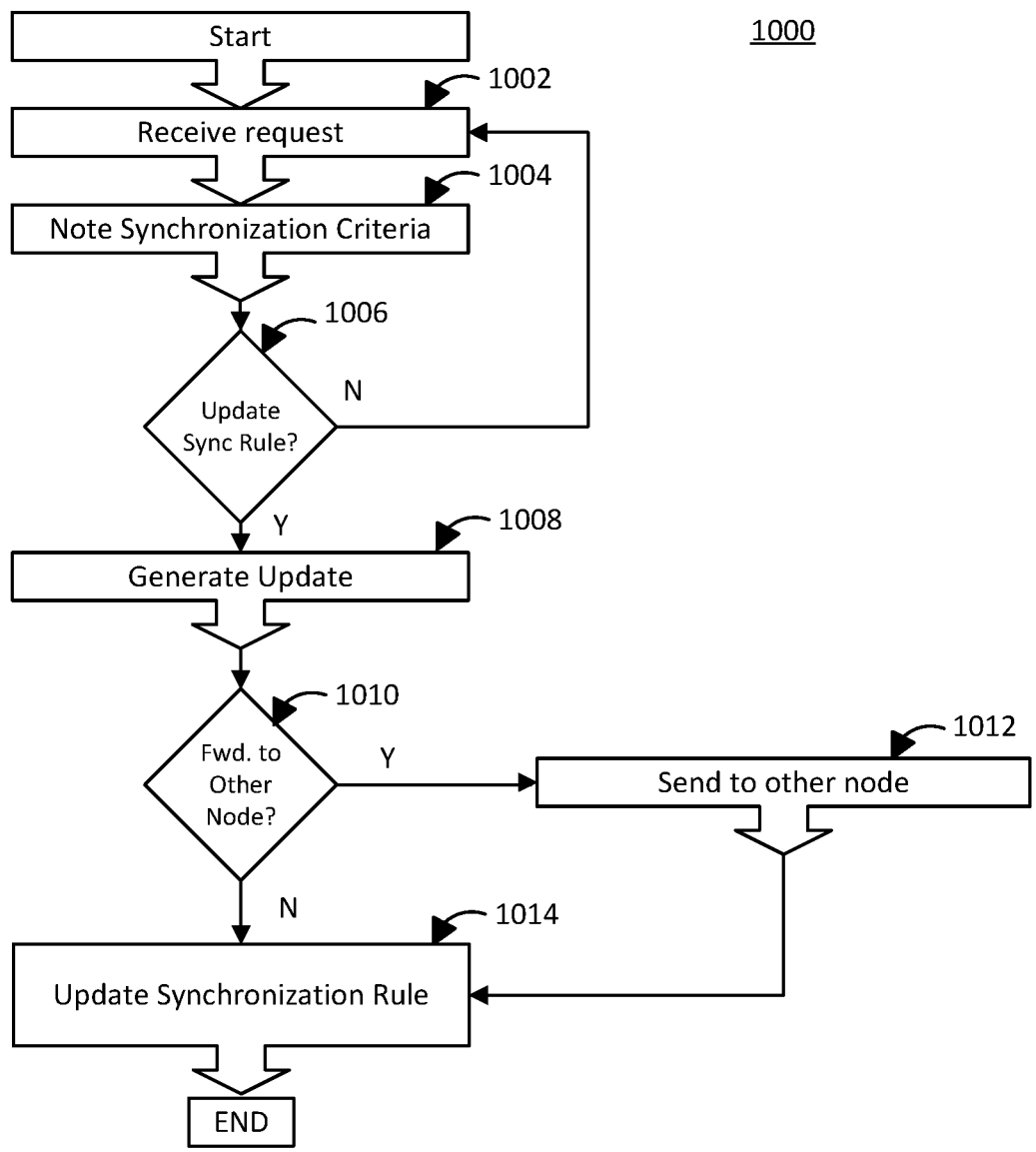
FIG. 11 is a flowchart depicting an exemplary method for updating synchronization rule at a node of a deployed ecosystem of IoT devices in accordance with some embodiments of the present disclosure.

FIG. 11 depicts a flowchart depicting an exemplary method 1000 for updating synchronization rule at a node of a deployed ecosystem of IoT devices in accordance with some embodiments of the present disclosure.

The process begins at step 1002, where a first node 32 receives a request for either a first data set, or first integration, from a second node 8. Implementation at the node 8 of a first application programming interface ("API") may be based on either the first dataset or the first integration. In some embodiments, answering the request may require forwarding the request to a third node 2.

After the request is received at step 1002, processing continues to step 1004, where the first node 32 may determine that a synchronization rule should be updated based on the request and at least one synchronization criterium. The synchronization criteria may be indicated by the request, and may indicate that a synchronization rule should be updated. In one example, a synchronization criterium may be a request threshold, which, if exceeded based upon a comparison of a number of received messages with the threshold, may indicate that a synchronization rule should be updated to change from a request model to subscribe model. Other criteria can be noted and other synchronization rule updates are possible. Once the at least one synchronization criterium has been noted, processing may proceed to step 1006.

At step 1006, the node may determine, based on the at least one synchronization criterium, whether to update one or more synchronization rules. The at least one synchronization criterium may be a number of previous requests for the same or similar information that have been received, either from a child node or parent node; scheduling information (e.g., dates, times, units, tasks, etc.), a desired power usage level, desired storage capacity, or desired messaging latency. As noted above at step 1004, the criteria may trigger an update to the synchronization rules of one or more nodes as described above. The update may be for updating the synchronization rules at the node 32, or for updating synchronization rules of other nodes (e.g., grandparent 40, parent 30, etc.). If a synchronization rule should not be updated, processing may return to step 1002, where an additional information request may be received and processing may resume. If a synchronization rule should be updated, processing may proceed to step 1008.

At step 1008, a synchronization rule update may be generated at the node 32. The synchronization rule update may comprise a change to at least one synchronization behavior of at least one node of the IoT hierarchy. As an example, the synchronization rule update may specify that a synchronization rule of a node operating as a request model should switch to a subscribe model. Once the update has been generated, processing may proceed to step 1010, where the node may determine whether to forward to at least one other nodes. This may be based on a determination that synchronization rules of at least one other node should be updated, either instead of or in addition to a synchronization rule of the node 32.

If the node determines not to forward the update, processing may proceed to step 1014. If the node should forward the synchronization rule update to at least one other nodes, the node 32 may provide the synchronization rule to the at least one other nodes at step 1012. Thereafter processing may proceed to step 1014, where the respective synchronization rules of the at least one other nodes may be updated based on the synchronization rule update. Thereafter processing may end.

In operation of the continuum 1, nodes may be configured to communicate using various communication networks. A node may be associated with these communications networks via connectivity through its communication interface 808. Each node of the continuum 1 may be configured to communicate with other nodes of the continuum 1 or even other devices via connections to one or more of these communication networks.

Each of the different networks available to a node may have different attributes. An associated cost to transport data over network may differ from network to network. For example, it may be much cheaper to transport data over a Long Range (LoRa) based network than it would be to transport the same data over a cellular LTE network or satellite network. Limitations on quantities of data (e.g., bandwidth) that can be transported on such networks, as well as availability and coverage areas associated with these networks also varies. In remote areas, such as rural areas, networks operating according to RF protocols (e.g., UHF) may be the only networks available. In even more remote areas like polar regions, the only networks available may be satellite based. However, in many areas, a node may have connections to more than one network for transporting its data.

In some embodiments, a node 800 may select a network based on message priority and network availability. As an example, a node may need to send or receive a high priority message. The node may determine that it is desirable to use a network that has better performance characteristics than the node's default or primary communication network for transporting the high priority message. For example, the network may have high messaging latency (e.g., slow transportation of data), or may have insufficient data quality (e.g., resulting from packet loss or interrupted connectivity). The node may determine that a communication is available over an additional network connection. If the network has sufficient characteristics (e.g., data transportation speed and quality), the node may select that network connection to transport its important, high priority message. Otherwise, the node may determine whether other additional network connections provide access to a network with sufficient characteristics. If the node identifies such a network, it may select the network for communication of its high priority message. If not, it may select a next most suitable network based on similar information. The node may continue to attempt to identify a network with better performance than its primary/default network until it has compared all available networks. In some cases, the node may ultimately select the node's default or primary communication network because no better alternatives exist (e.g., in a rural area or very remote area where only one communication network option exists). In this case, or others, the node may determine that it should adjust its policies for providing data (e.g., in node logic 822) to modify (e.g., increase or decrease) an amount of data that can be sent by the node over the network in order to improve communication efficiency with the node over the network.

For messages having a normal priority, a node may determine a message's priority and the available networks, and may determine characteristics associated with the available networks. The node may rank the available networks by one or more desired characteristics, such as cost, network speed, bandwidth, data quality, and reliability, and may select a network having a lowest cost and acceptable data transportation performance (e.g., speed). In this regard, if two networks offer essentially the same data transportation performance (e.g., speed, bandwidth, etc.), but data may be sent over one network for free (e.g., WiFi) but not the other (e.g., cellular/LTE/satellite), the node may be configured to select the free network and send the message via the free network.

These techniques achieve various technical improvements over existing systems. For example, data transportation costs and efficiency across an IoT network are improved because network traffic is transported over a least expensive acceptably-performing communication network unless the messaging has a priority level that justifies sending it over a more costly communication network. This allows high priority and non-high priority messages to be provided efficiently.

Costs are also improved because nodes can detect connections to a cheaper network and use the cheaper network to transport their messages while available. This may occur in a practical application when a node travels into and out of range of a network that is less expensive with acceptable performance when compared with a network over which it is otherwise communicating messages. A practical example of this is when a boat travels from a port, where it is within range of land-based WiFi network, to a position that is out of range of the WiFi network but within range of cellular networks and satellite network (a few miles off the coast). One or more nodes on the ship may detect the cellular network and switch to communication over it because, for normal messaging, communication over the cellular connection is cheaper than satellite communication, although both may be available have suitable message transportation quality. When the ship moves out to sea and out of range of the cellular network, into an area where only satellite communication is available comes, the one or more nodes may detect that satellite communication is the only available communications network and use it for transporting messages. The nodes may note a cost associated with use of the satellite network and adjust their behavior so that only high priority messages are sent over the satellite network.

Again, the behavior and functionality ascribed to the one or more nodes herein may be implemented by logic stored at the one or more nodes as node logic 822. The node logic 822 can implement these behaviors and functionalities as rules for dynamically selecting a communications network/protocol, and can update such rules based on contextual information about available networks and their attributes (e.g., cost, speed, bandwidth, reliability, etc.).

Figure 12:
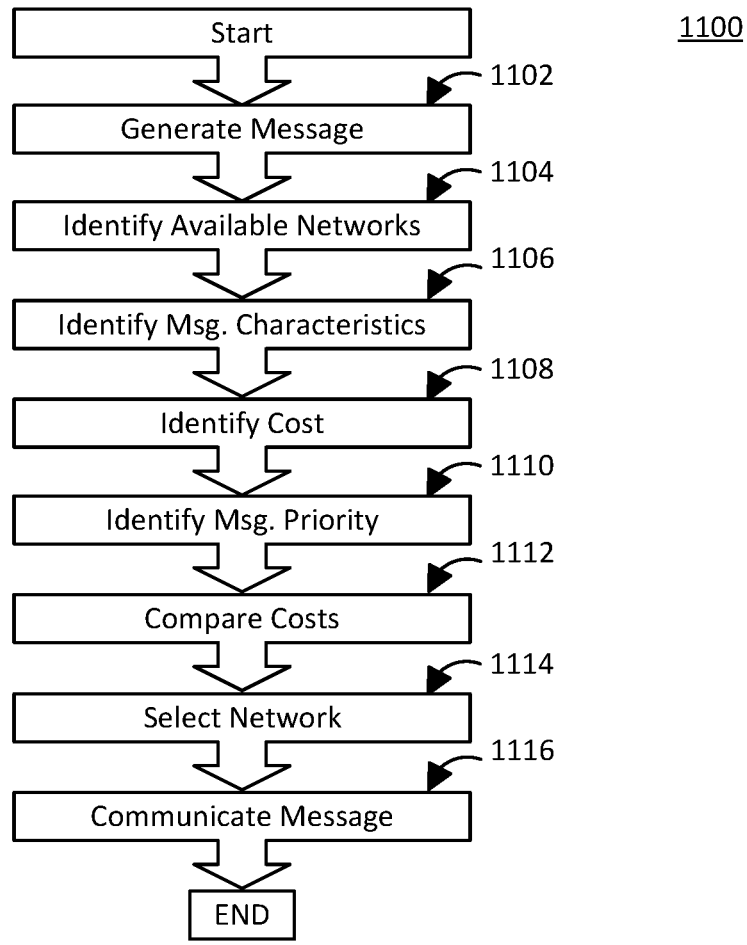
FIG. 12 is a flowchart depicting an exemplary method for selecting a communication protocol at a node of a deployed ecosystem of IoT devices in accordance with some embodiments of the present disclosure.

FIG. 12 depicts a flowchart depicting an exemplary method 1100 for selecting a communication protocol at a node of a deployed ecosystem of IoT devices in accordance with some embodiments of the present disclosure. The steps of FIG. 12 and functionality ascribed herein to one or more nodes (e.g., exemplary node of FIG. 8.) with regard to selection of a communication network and protocol may be performed by one or more nodes 800 executing node logic 822. Data referenced with regard to node operations described with reference to FIG. 12 may be stored in memory 810 of one or more nodes (e.g., exemplary node of FIG. 8). Yet other components and devices may be implemented in order to achieve the functionalities ascribed herein.

The process begins at step 1102, where a first node 32 may generate a message. The message may comprise state data, a request for a first data set, or a request for a first integration for transmission to one or more nodes of the continuum (e.g., grandparent 40). The message can include various information described herein about a state of one or more associated systems, as well as information or integrations needed in order to implement an API at one or more nodes.

In some embodiments the message may be a forwarding of a message from a child or parent node, and can include various processing steps to generate the message (e.g., consultation of a lookup table for comparison with destination information of a forwarded message, evaluation of a messaging type such as unicast, multicast or broadcast messaging, modification of one or more data packets comprising the message, etc.). Once the message has been generated processing may proceed to step 1004.

At step 1104, the node may identify one or more communication networks that are available at the node. The node may be in communication with various numbers and types of available networks as described herein. The available communication networks the node may identify can include a first available communication network and a second available communication network, although other numbers of networks may be available to the node in some embodiments. In some embodiments, available networks, including the first and second available communications networks, may be identified based on one or more signals provided to ports of the communication interface 808 of the node. Each of the ports of the communication interface may be associated with a type of communication network. In some embodiments, the node may identify one or more additional available communications networks, and may continue to do so until all available communications networks at the node have been identified. The node may note available networks and associated information and store this information in memory 810 for use in selecting a network for communication.

To establish which networks are available, the node 800 may provide one or more signals to (e.g., "ping" or other similar signal or message that may be used to confirm availability of a network by communicating with it) the one or more ports of the interface 808. The node may receive a response at at least one port of the interface 808, based on the one or more signals, such as a response from the network confirming that the network is available for communicating (e.g., transmitting and receiving of) the message. Based on the response to the one or more signals, the node 800 may determine an availability status associated with the type of communication network associated with the respective one or more ports. That is, if the node 800 receives a response to the one or more signals at a port of the communications interface 808, the node 800 may determine that the respective network associated with the port is available. Otherwise, the node 800 may determine that the network associated with the port is not available. The node 800 may base its determination on other information in some embodiments, such as after waiting for expiration of a period of time to receive a response to the signal, after a number of attempts to communicate with the network exceeds a threshold based on a predetermined number of attempts for the type of network, or otherwise. In some embodiments, the node may be able to determine which networks are available by noting an availability status flag (e.g., a bit or other indicator) associated with a port, and in some embodiments, may determine available networks based on information received at the node about the network (e.g., that the network has an internal keep-alive feature, that there is a window for opening a network link to communicate data and messages, etc.).

At step 1106, the node may identify at least one message characteristic of the message that should be transmitted. Message characteristics can be stored in memory 810 of the node and may describe various information about the message, including one or more of a message content (e.g., file types included), message type (e.g., messaging protocol, SMS/MMS, whether the message is unicast, multicast, broadcast, etc.), and message size (e.g., an approximate total size in bytes or otherwise). Other messaging aspects that may be stored as a message characteristic include information about routing of the message (ports, destination nodes, paths, etc.), a time to live value, or other messaging characteristics.

Once the at least one messaging characteristic has been identified, processing may proceed to step 1108, where the node may identify a cost to communicate the message via each of the available communication networks. A cost to communicate the message via the selected network may comprise a determination of cost for sending the message based on the message size and cost per byte for communicating over the network. Cost also may be determined by noting a latency in transmitting and receiving the message (e.g., delay from when the message is transmitted until it is received) using the network. Cost may be a limitation on a rate of data transfer, such as determined by comparing a bandwidth limit of the network (e.g., available bandwidth) with a bandwidth requirement of the message (e.g., size). Cost also may be determined as a function of a loss of data during transfer, such as packet loss or reduced signal quality. Cost may be associated with network reliability, such as when a network is intermittently unavailable. In some embodiments, cost may be determined based on other aspects associated with communication of the message for a given network.

For example, a cellular or LTE network may have a lower latency and higher data transfer rate and lower packet loss when communicating a message than if the message is communicated via LPWAN, but may have a higher cost. Similarly, communicating a message via satellite may have better quality, availability and reliability than a cellular network, but may be more expensive than cellular. A fiber connection may have a better data transportation reliability and quality and lower cost than wireless alternatives, but availability may be far lower in most geographies.

In the embodiment of FIG. 12, the node 800 may determine one or more costs associated with communication of the message via the first and second available communication networks and may compare them as noted below at step 1112.

After one or more costs to communicate the message via each of the available networks has been identified, at step 1110, a priority associated with the message may be identified at the node 800. The message may have various indicators of priority (e.g., high, medium, low), which may specify a communication priority rule or behavior stored in node logic 822. Of course, other priority descriptors and behaviors will be possible in some embodiments, and the priorities described herein are exemplary and illustrate only some of the multitude of combinations and choices for assigning a message a priority value and implementing priority rules associated with priority value levels.

For the sake of brevity and to illustrate a few limited examples of such communication priority rules or behavior, a high priority may specify that a message should be sent as soon as possible using the most reliable and highest quality communication network available, without regard to cost to communicate the message. A medium or elevated priority may specify that the message should be sent as soon as possible, but not before other messages of the same or lower priority, and with limitations on one or more associated cost (e.g., communication should be performed using an available network with a sufficient reliability that is below a cost threshold). A low or normal priority message may be sent after other higher priority messages and in turn with other low-priority messages, and using a default communication network (which also may be the cheapest and most commonly used network, even if networks with better transmission quality and better reliability are available).

Once a priority associated with the message has been identified, at step 1112, the node 800 may compare one or more costs to communicate the message via each of the available networks in order to select a desired network at step 1114. In the embodiment of FIG. 12, the node is comparing one or more costs associated with each of the first and second communications networks, but in many instances, there may be more than two available networks, and in some embodiments, the node logic 822 may be configured to compare some or all available communications networks. In some embodiments, the node 800 may compare the one or more costs of sending the message via the first communication network with the one or more costs to communicate the message via the second communication network to select between them. The comparison may be performed piecemeal, or may be carried out by assigning a score to a network, e.g., by noting the network characteristics and costs described above and assigning a predetermined value to one or more such characteristics and costs. The node may note and compare scores across characteristics and costs of the networks, and may use the scores to arrive at a total score for each network. Such scores may be indicative of suitability for communicating the message (e.g., based on priority, message characteristics, or otherwise), and may be used to determine a ranking that may be used to select a communication network at step 1114. In some embodiments, the comparing step 1112 may comprise comparing a communication quality of the first communication network with a communication quality of the second communication network, as well as a cost to communicate the message via the second network is higher than the cost to communicate the message via the first network.

The node may select one or more communication networks at step 1114. The one or more communication networks can include a network with a highest score or ranking or may be selected based on other aspects of the network, message priority, or other factors about the available networks compared by the node. More than one network may be selected in some embodiments, using similar techniques. In the embodiment of FIG. 12, the node may select either the first communication network or second communication network based on the message priority and comparison at step 1112. For further clarification of the embodiment of FIG. 12, a communication quality associated with communicating the message via the second network may exceed a communication quality associated with communication via the first network. In this regard, the node may select the second network is based on at least the communication quality and the priority (e.g., high or medium priority). However, in some embodiments a communication quality associated with communicating the message via the second network exceeds the communication quality associated with communication via the first network, but the first network is selected based on a higher communication cost associated with the second network and message priority (e.g., medium or low priority).

Once a communications network has been selected at step 1114, processing may proceed to step 1116, where the message may be communicated via the communication interface 808 of the node 800 the selected communication network. In some embodiments, the message may be communicated by more than one network if more than one network has been selected for communication of the message. Thereafter, processing may end.

Nodes may have various APIs stored in node logic and available for use in response to queries from other nodes. In some instances, code or logic may be required in order to implement such APIs. As noted herein, nodes of the continuum 1 may communicate various data, including data sets and integrations for use in implementing various APIs at nodes of the continuum.

In some embodiments, in some embodiments, an integration required for implementation of an API may comprise logical processing according to one or more artificial intelligence (A/I) algorithms. Example A/I algorithms may include, among others, machine learnin; neural network; supervised learning, unsupervised learning, Naïve Bayes; decision tree; Random Forest; linear regression; logistic regression; support vector machines; K nearest neighbors (KNN); and K-Means clustering, although other A/I algorithms are possible in some embodiments.

In some embodiments, a node 800 may be configured to execute or implement an API that, when called, may apply logic comprising one or more artificial intelligence algorithms. Each of the API and integration in the form of the logic comprising one or more artificial intelligence algorithms may be stored in memory 810 of a node 800 as node logic 822 (FIG. 8), and associated data may be stored as application data 820. The node 800 may be various positions in the hierarchy of the continuum 1 (FIG. 2) (e.g., child node, parent node, grandparent node, great-grandparent node or cloud). Again, the various functionality ascribed to nodes herein may be stored as instructions in memory 810 and may be implemented by a node 800 executing node logic 822.

Technical improvements of using an A/I algorithm to implement APIs at the edge instead of at the cloud include increased efficiency in communication, reduction in need to request information, reduction in network traffic and more informed functioning of a network of nodes of an IoT hierarchy, as well as their associated devices may be achieved through the techniques described herein. For example, by placing an artificial intelligence algorithm at a parent node 32 positioned in the hierarchy as an edge node, the artificial intelligence integration may be applied whenever the node 32 calls an API. The node 32 may frequently receive state updates and other information from its child nodes 8-12. The node 32 may store such information in memory (e.g., memory 810), and may then use this data to train the A/I algorithm periodically, such as when new data arrives via an update to a state of a child node or one or more of its associated devices. In this regard, the node 32 may be able to collect and store data from, its parent nodes, or other nodes for use in training the A/I algorithm. In this way, use of an A/I algorithm as an integration at edge 32 may improve decision making at nodes operating under node logic 822, and may allow for more informed contextualized operation of systems associated with the continuum 1.

As an example of an operation and practical application of the use of an A/I algorithm to implement one or more APIs at a node, in an embodiment, a child node 8 of a continuum may be associated with a truck (e.g., truck 302 of FIG. 3) carrying a load of corn (e.g., package 300). The child node 8 may periodically provide information including state updates from its various sensors to the parent edge node 32, such as by executing synchronization rules stored in its node logic. The parent node 32 may store this information and information from other child nodes 8-12 for use in training one or more A/I algorithms needed to implement an API at the node.

If a parent edge node 32 (or user of a device associated with node 32) wishes to know when the truck will arrive, API "GET ARRIVE" may be called to implement an API to determine an estimated arrival for the truck 302. The A/I algorithm implemented by the API may be trained (e.g., by executing node logic) using previous data provided by the node 8 and other child nodes to the parent 32. In this regard, the API may be operable to factor in various information that may affect a predicted arrival time, such as an expected speed for a particular driver who is driving the truck 302, an expected number of stops, an expected duration for such stops, an expected route, as well as adjustments to arrival time based on these factors. Data about past instances of each category may be provided to the node 32 by node 8 and may be stored in memory at node 32. Other information may be considered by an API implementing the "GET ARRIVE" API at the node 32, and other APIs may be available for implementation at the node. In some embodiments, a result returned by the API may comprise a conclusion (e.g., arrival time will be 4:30 pm) and a probabilistic confidence (e.g., confidence level is 92%) associated with the result.

In some embodiments, the node 32 may determine that the integration should be shared with one or more nodes of the continuum (e.g., nodes 40, 30) that also implement one or more of the same or similar APIs as node 32.

As an exemplary method for generating a data set from a trained integration at a node of a deployed ecosystem of IoT devices, a first node 32 may receive a first data set from a second node 8. The first node 32 may train an integration, which may be an A/I algorithm, at the first node. The integration may be implemented by an API using the first data set. In some embodiments, the integration may comprise an artificial intelligence logic. Various nodes of the continuum 1 may have the integration or a similar integration if associated with the same or similar API stored at the first node 32. In some embodiments, at least the first node 32 and third node 40 have the integration. The first node 32 may generate a second data set based on the trained integration. This second data set may be generated by applying the API to implement the trained integration. Subsequently, the node 32 may determine, that the second data set or trained integration should be provided to the third node 40, such as when a request is received for the second data set or trained integration or when the node 32 determines that the third node 40 comprises the same or similar API implementing the same or similar integration. If the node 32 determines that the second data set or trained integration should be provided to the third node 40 or another node, it may provide the second data set or trained integration to the relevant nodes.

It will be understood that other applications of the techniques described herein using IoT architecture may be possible in other embodiments. In this regard, the logic 822 may be configured perform synchronization and update synchronization rules using one or more or various combinations of the techniques described herein.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A method for dynamically updating a synchronization rule at a node configured to communicate with other nodes in an Internet of Things (IoT) hierarchy, comprising:
    receiving, at a first node, a request for either a first data set, or first integration, from a second node, wherein implementation of a first application programming interface ("API") is based on either the first dataset or the first integration, and wherein answering the request requires forwarding the request to a third node;
    determining, at the first node, that the synchronization rule should be updated based on the request and at least one synchronization criterium, wherein the determining comprises a determination that the request comprises information included in a previous request from the second node and that the synchronization rule should be updated to forward such information automatically to the first node without first receiving the request;
    generating, at the first node, a synchronization rule update, wherein the synchronization rule update comprises a change to at least one synchronization behavior of the first node and of the third node; and
    updating, at the first node and the third node, the synchronization rule based on the synchronization rule update.

2. The method of claim 1, wherein the at least one synchronization criterium comprises a desired power usage level, desired storage capacity, or desired messaging latency.

3. The method of claim 1, wherein the synchronization rule comprises a request model, and wherein at least one synchronization behavior comprises a request model or a subscribe model.

4. The method of claim 1, wherein the synchronization criterium comprises a request threshold.

5. The method of claim 4, wherein the request threshold is based on requests received from a child node of the first node.

6. The method of claim 4, wherein the request threshold is based on requests received from a parent node of the first node.

7. The method of claim 1, wherein the synchronization criterium comprises a scheduling model.

8. The method of claim 1,
    wherein the updating comprises comparing the synchronization rule update with the synchronization rule identifying the relevant portions of the synchronization rule for updating, and only updating the relevant portions of the synchronization rule.

\* \* \* \* \*